(12) United States Patent
Venti et al.

(10) Patent No.: US 11,169,770 B1
(45) Date of Patent: *Nov. 9, 2021

(54) MUSIC-BASED SOCIAL NETWORKING MULTI-MEDIA APPLICATION AND RELATED METHODS

(71) Applicant: Look Sharp Labs, Inc., La Mesa, CA (US)

(72) Inventors: Nicholas Venti, San Diego, CA (US); Brian Karscig, La Mesa, CA (US)

(73) Assignee: LOOK SHARP LABS, INC., La Mesa, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/138,695

(22) Filed: Dec. 30, 2020

Related U.S. Application Data

(63) Continuation of application No. 16/592,549, filed on Oct. 3, 2019, now Pat. No. 10,891,103, which is a
(Continued)

(51) Int. Cl.
*G06F 3/048* (2013.01)
*G06F 3/16* (2006.01)
(Continued)

(52) U.S. Cl.
CPC ............ *G06F 3/165* (2013.01); *G06F 3/0484* (2013.01); *G06F 16/435* (2019.01); *H04L 67/10* (2013.01); *H04L 67/146* (2013.01); *G06F 3/0482* (2013.01)

(58) Field of Classification Search
CPC .... G06Q 50/01; H04N 21/4788; H04L 51/32; H04L 51/046; H04L 51/10; H04L 67/306; H04L 63/104
See application file for complete search history.

(56) References Cited

U.S. PATENT DOCUMENTS 8,819,030 B1   8/2014   Freed et al. .................. 707/748
9,021,088 B2   4/2015   Bilinski et al. ... G06F 17/30053
(Continued)

OTHER PUBLICATIONS

Oyang et al., Characterizing the Service Usage of Online Video Sharing System: Uploading vs. Playback; IEEE; 2016, 7 pages.*
(Continued)

*Primary Examiner* — Linh K Pham
(74) *Attorney, Agent, or Firm* — Hayes Soloway P.C.; Jonathan D. Spangler

(57) ABSTRACT

Systems and methods for creating personalized digital music and digital visual media content to users of media devices include uploading live-streamed digital visual media content to a host server, wherein the live-streamed digital visual media content is assigned a first URL stored in the host server. At least one digital music content file is selected to be streamed from an external audio content provider, wherein the at least one digital music content file is personalized to the user. The selected digital music content file has a second URL stored in the host server. The live-streamed digital visual media content is paired with the digital music content file to create paired digital music and live-streamed digital visual media content. The paired digital music and live-streamed digital visual media content is played by executing the first and second URLs simultaneously.

18 Claims, 14 Drawing Sheets

Related U.S. Application Data continuation of application No. 15/490,800, filed on Apr. 18, 2017, now Pat. No. 10,474,422.

(60) Provisional application No. 62/324,243, filed on Apr. 18, 2016.

(51) Int. Cl.

| | | |
|---|---|---|
| *H04L 29/08* | (2006.01) | |
| *G06F 3/0484* | (2013.01) | |
| *G06F 16/435* | (2019.01) | |
| *G06F 3/0482* | (2013.01) | |

(56) References Cited

U.S. PATENT DOCUMENTS

| | | | | |
|---|---|---|---|---|
| 9,992,316 | B2 | 6/2018 | Hardi | H04M 1/6066 |
| 10,178,365 | B1 | 1/2019 | Singh et al. | H04N 9/802 |
| 10,333,876 | B2 | 6/2019 | Guthery et al. | H04L 51/10 |
| 10,474,422 | B1 | 11/2019 | Venti et al. | G06F 3/165 |
| 10,891,103 | B1 | 1/2021 | Venti et al. | G06F 3/165 |
| 2009/0128335 | A1 | 5/2009 | Leung | G06Q 30/02 |
| 2009/0187624 | A1 | 7/2009 | Brownholtz | G06Q 10/10 |
| 2012/0144343 | A1 | 6/2012 | Tseng | 715/834 |
| 2012/0278387 | A1 | 11/2012 | Garcia | G06Q 50/01 |
| 2012/0304087 | A1* | 11/2012 | Walkin | H04L 12/1813 715/764 |
| 2013/0066964 | A1 | 3/2013 | Odio | G06Q 50/01 |
| 2013/0173742 | A1 | 7/2013 | Thomas | H04L 65/4076 |
| 2013/0297686 | A1* | 11/2013 | Bilinski | H04L 65/60 709/204 |
| 2014/0123041 | A1* | 5/2014 | Morse | G11B 27/105 715/765 |
| 2014/0181110 | A1 | 6/2014 | Imbruce et al. | G06F 17/30598 |
| 2014/0214848 | A1 | 7/2014 | Devkar et al. | G06F 17/30053 |
| 2014/0280498 | A1* | 9/2014 | Frankel | H04L 65/4084 709/203 |
| 2014/0337761 | A1 | 11/2014 | Glass | H04L 65/403 |
| 2015/0089397 | A1 | 3/2015 | Gorod et al. | G06F 3/0482 |
| 2015/0195620 | A1 | 7/2015 | Buchner | H04N 21/4788 |
| 2015/0215597 | A1 | 7/2015 | Xu | G11B 20/10527 |
| 2015/0339300 | A1 | 11/2015 | Stoddard, II et al. | G06F 17/30056 |
| 2015/0373065 | A1 | 12/2015 | Holmquist | H04L 65/403 |
| 2016/0173683 | A1 | 6/2016 | Abreu | H04L 51/24 |
| 2016/0217328 | A1* | 7/2016 | Yanai | G06K 9/00671 |
| 2016/0224311 | A1* | 8/2016 | Touch | G06F 3/165 |
| 2016/0227115 | A1 | 8/2016 | Bin Mahfooz et al. | H04N 5/23245 |
| 2016/0246452 | A1* | 8/2016 | Bockhold | G06F 3/0488 |
| 2016/0248840 | A1* | 8/2016 | Bockhold | H04L 51/32 |
| 2017/0024399 | A1 | 1/2017 | Boyle | G06F 16/903 |
| 2017/0289202 | A1* | 10/2017 | Krasadakis | H04L 65/60 |
| 2017/0372525 | A1 | 12/2017 | Rosenthal et al. | G06T 19/006 |
| 2019/0045252 | A1 | 2/2019 | Lyons et al. | H04N 21/2668 |
| 2019/0163830 | A1 | 5/2019 | DeLuca | G06F 17/30867 |
| 2019/0197589 | A1 | 6/2019 | Singh et al. | G06Q 30/0279 |
| 2019/0286720 | A1 | 9/2019 | Agrawal et al. | G06F 17/30268 |

OTHER PUBLICATIONS

Xing et al., Proximiter: Enabling Mobile Proximity-Based Content Sharing on Portable Devices; © 2009 IEEE; 3 pages.*

Belimpasakis et al., Home Media Atomizer: Remote Sharing of Home Content—without Semi-trusted Proxies; © 2008 IEEE; 9 pages.*

Pering et al., Face-to-Face Media Sharing Using Wireless Mobile Device; 2005; IEEE; 8 pages.*

U.S. Appl. No. 15/490,800, filed Apr. 18, 2017.

U.S. Appl. No. 16/592,549, filed Oct. 3, 2019.

U.S. Appl. No. 16/699,330, filed Nov. 29, 2019, Venti et al.

Notice of Allowance issued in U.S. Appl. No. 15/490,800, dated Aug. 29, 2019 (9 pgs).

Office Action issued in U.S. Appl. No. 15/490,800, dated Jun. 27, 2019 (18 pgs).

Office Action issued in U.S. Appl. No. 15/490,800, dated Sep. 7, 2018 (18 pgs).

Wu et al., Bridging Music and Image via Cross-Modal Ranking Analysis; IEEE, Jul. 2016; 14 pgs.

Notice of Allowance issued in U.S. Appl. No. 16/592,549, dated Sep. 9, 2020 (10 pgs).

Office Action issued in U.S. Appl. No. 16/592,549, dated Aug. 21, 2020 (9 pgs).

Office Action issued in U.S. Appl. No. 16/592,549, dated May 29, 2020 (35 pgs).

Maestre et al., Enriched Multimodal Representations of Music Performances: Online Access and Visualization; IEEE; 2017; 11 pages.

* cited by examiner

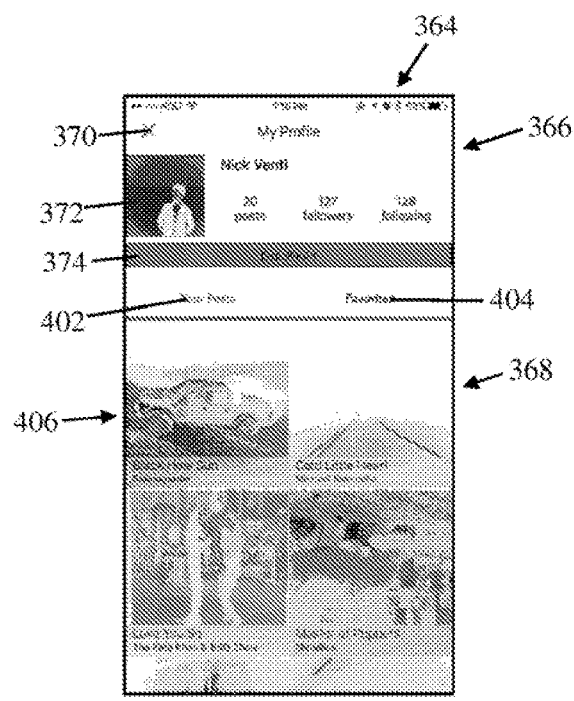
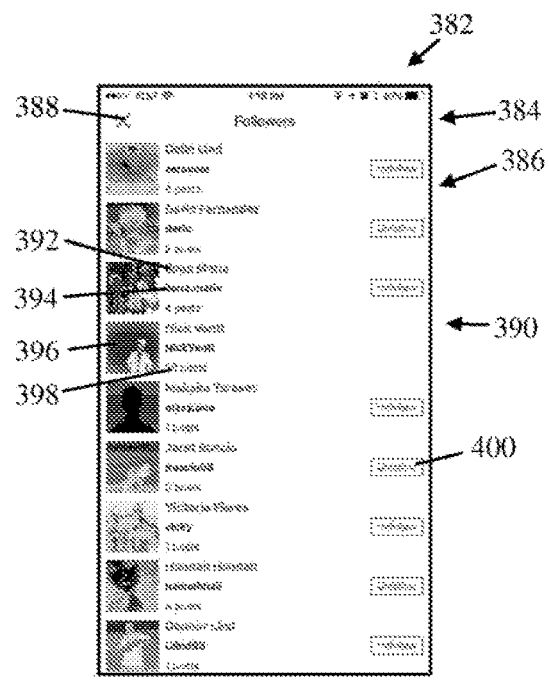
Fig. 28    Fig. 29
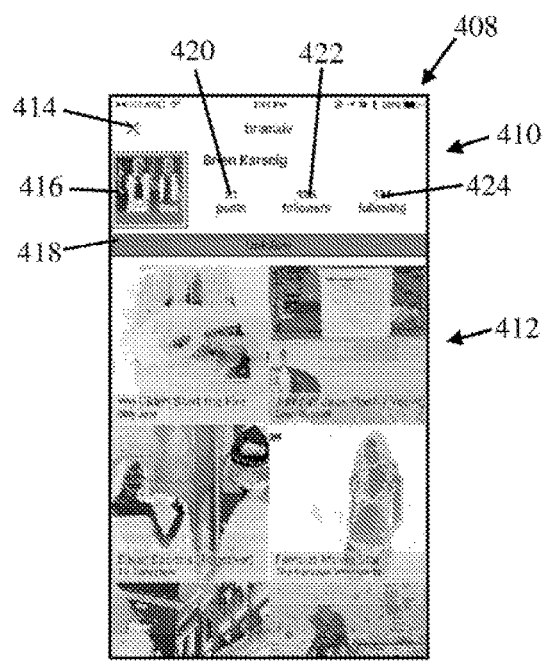
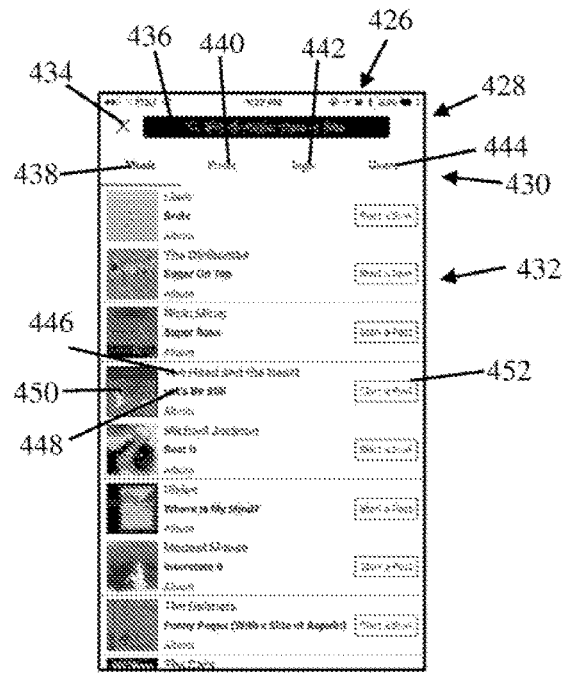
Fig. 30    Fig. 31

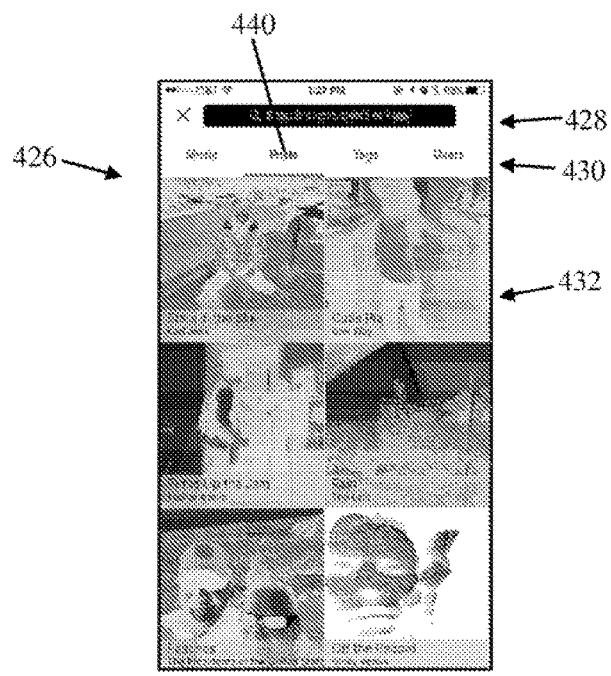
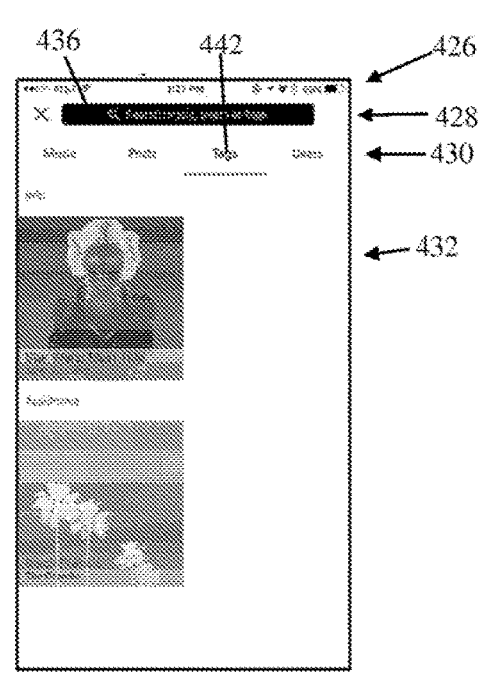
Fig. 32
Fig. 33
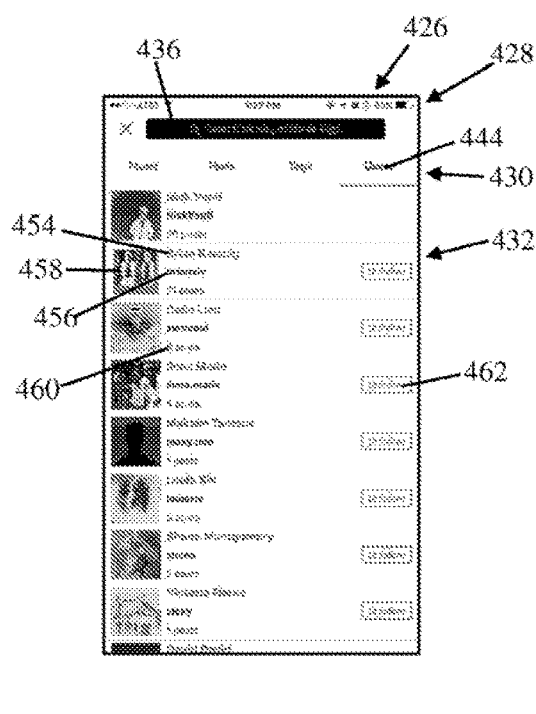
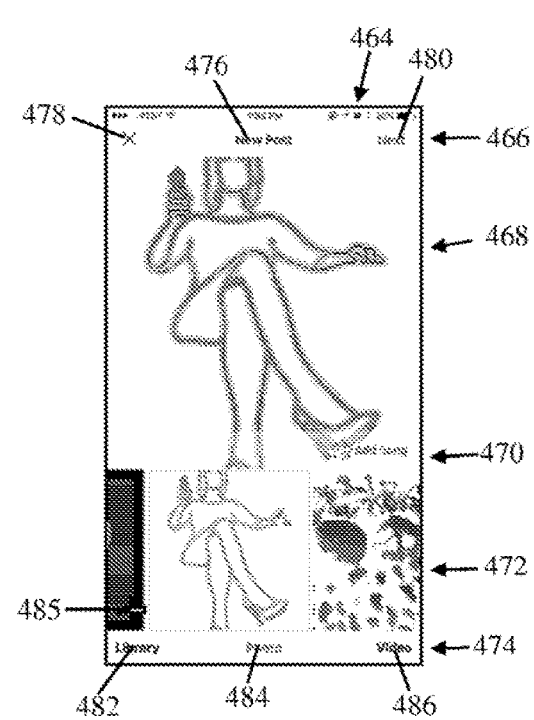
Fig. 34
Fig. 35

MUSIC-BASED SOCIAL NETWORKING MULTI-MEDIA APPLICATION AND RELATED METHODS

CROSS-REFERENCES TO RELATED APPLICATIONS

The present application is a continuation application of U.S. application Ser. No. 16/592,549 filed Oct. 3, 2019, which itself is a continuation application of U.S. application Ser. No. 15/490,800, filed Apr. 18, 2017, now U.S. Pat. No. 10,474,422, which itself claims benefit to non-provisional patent application claiming benefit under 35 U.S.C. § 119(e) from U.S. Provisional Application Ser. No. 62/324,243, filed on Apr. 18, 2016, the entire contents of which are hereby expressly incorporated by reference into this disclosure as if set forth fully herein.

FIELD

The present disclosure relates generally to social networking and, more specifically, to a social networking application with unique multi-media capabilities that combine music with media (photos, videos, GIFs, etc. . . . ).

BACKGROUND

Social networking has enjoyed explosive growth over the past several years, enabling unprecedented connectivity and social networking among users of smart phones, computers, and tablets based on the information infrastructure possible through the advent and proliferation of the internet and wireless communication technology. A host of applications exist to facilitate the consumption of music, whether via streaming, downloading, etc. . . . . While a number of applications target either category (social networking or music consumption), there is currently no application that combines them into a significant social network that revolves around music and music related media. For example, current apps and music platforms like Spotify, Apple music, YouTube and Google play offer an immense amount of music and digital media, however, they have failed to connect fans, friends, artists and allow them to discover and share music in a meaningful and social way.

The present disclosure addresses the unmet need for a social networking platform that changes the way fans and friends share and discover new music.

SUMMARY

Embodiments of the present disclosure provide a system and method for an application for use on a communications device for creating and sharing a music-based social media post comprising digital visual media content paired with digital music content between at least two users each having a communications device with computer-readable media and utilizing one or more processors which are configured to cause a computer system to perform steps. Briefly described, in architecture, one embodiment of the application, among others, can be implemented as follows. Using a graphic user interface on a communications device of a first user, an upload, by the first user, of a live-streamed digital visual media content to a host server in digital communication with the communications device of the first user is initiated, wherein the live-streamed digital visual media content is assigned a first uniform resource locator (URL) stored in the host server. Using the graphic user interface on the communications device of the first user, a selection by the first user of at least one digital music content file to be streamed from an external audio content provider in digital communication with the host server or uploaded to the host server from the communications device of the first user is initiated, wherein the selected digital music content file has a second URL stored in the host server, and wherein the second URL is separate from the first URL. Using the graphic user interface on the communications device of the first user, a request is initiated by the first user received by the host server to pair at least a portion of the live-streamed digital visual media content with at least a portion of the selected digital music content file, whereby digital visual media content of the live-streamed digital visual media content and digital music content of the selected digital music content file are configured to be presented in parallel while remaining separate and without creation of a single combined file. Upon a request by the first user received by the host server, the paired digital content is shared with at least one additional user on a communications device of the at least one additional user. On the communications device of the at least one additional user, and upon a request received by the host server, the paired live-streamed digital visual media content and the selected digital music content file are played by executing the first URL and the second URL simultaneously.

The present disclosure can also be viewed as providing methods for enabling the creation and sharing of a music-based social media post comprising digital visual media content paired with digital music content between at least two users each having a communications device capable of transmitting and receiving electronic data content. In this regard, one embodiment of such a method, among others, can be broadly summarized by the following steps: providing a music-based social media network, including a host server capable of sending and receiving data transmissions and a software application providing a graphic user interface for one or more users to interact with the music-based social media network; receiving, in the host server, live-streamed digital visual media content selected by a first user through interaction with the graphic user interface and transmitted from the first user's communications device in digital communication with the host server, wherein the live-streamed digital visual media content selection is assigned a first uniform resource locator (URL) stored in the host server; receiving, in the host server, at least one digital music content file selection selected by the first user through interaction with the graphic user interface to be streamed from an external audio content provider, and wherein the digital music content selection file is assigned a second uniform resource locator (URL) stored in the host server and wherein the second URL is separate from the first URL; pairing, in the host server, the first URL of the live-streamed digital visual media content with the second URL of the digital music content file selection, whereby the live-streamed digital visual media content and digital music content are configured to be presented in parallel while remaining separate and without creation of a single combined file having both the selected live-streamed digital visual media content and the selected digital music content file; sharing, upon a request by the first user received by the host server, the paired first URL of the live-streamed digital visual media content with the second URL of the digital music content file with at least one additional user, thereby creating a visual social media post with corresponding music soundtrack on a communications device of the at least one additional user; and playing, upon receiving a request at the host server, the paired first URL of the live-streamed digital visual media content with the second URL of the digital music content selection on the communications device of the at least one additional user by executing both the first URL and second URL simultaneously.

The present disclosure can also be viewed as providing methods for creating personalized digital music and digital visual media content to users of media devices, the method performed on a computer system running an application including computer executable instructions to perform steps. In this regard, one embodiment of such a method, among others, can be broadly summarized by the following steps: uploading live-streamed digital visual media content to a host server in digital communication with a communications device of a user, wherein the live-streamed digital visual media content is assigned a first uniform resource locator (URL) stored in the host server; selecting at least one digital music content file to be streamed from an external audio content provider in digital communication with the host server or uploaded to the host server, wherein the at least one digital music content file is personalized to the user, and wherein the selected digital music content file has a second URL stored in the host server, and wherein the second URL is separate from the first URL; pairing at least a portion of the live-streamed digital visual media content with at least a portion of the digital music content file to create paired digital music and live-streamed digital visual media content, whereby the live-streamed digital visual media content and the digital music content are presented in parallel while remaining separate and without creation of a single combined file; and playing, on the communications device of the user, the paired digital music and live-streamed digital visual media content by executing the first URL and the second URL simultaneously.

The present disclosure describes a music-based social networking application (named "BLKBOX") for electronic communications devices (e.g. computers and mobile devices) that comprises a social network, music/media player, and music discovery platform. The application software (also referred to herein as "app" and "BLKBOX app") is presented as a user interface on communications devices that offers social networking tools, music discovery from connected user suggestions and posts, music discovery and suggestion from a proprietary algorithm, and streaming music paired with streaming user media content (e.g. videos, pictures, GIFs) with editing capabilities. The application software aggregates major streaming music libraries (e.g. including but not limited to Spotify, Apple Music, iTunes, YouTube, Amazon, Napster, Google Music, and the like) and pulls from their libraries into the functionality of the app. Users may post a song, music video, or paired content (e.g. music paired with original media content) to the public feed where other users may "like", share, and/or comment related to the post. Additionally, users may share music to external social media outlets, for example Facebook, Twitter, etc. Users can send private messages, buy the song on digital music stores (e.g. iTunes, Spotify, AmazonMP3, Google Music, eMusic, Napster, etc.), and share with other users and non-users via SMS and/or email.

According to one aspect of the present disclosure, the BLKBOX application described herein may be used to create and share paired content. By way of example, "pairing" refers to the process of associating streaming music from an external music source with user media content uploaded to or otherwise available within the application (e.g. video, picture, etc. . . . ) such that the streamed music and uploaded user media content are presented in parallel, that is, simultaneously but separately on two (2) Uniform Resource Locators (URLs)—one URL for the streamed music, one URL for the uploaded user media content. In one step, a user selects visual media (e.g. picture, video, livestream, GIF, etc.) from the user's communications device or an external media source using the graphic user interface (GUI) of the BLKBOX application. In another step, the user (using the GUI of the BLKBOX application) selects a song to be paired with the selected visual media from the user's communications device or an external streaming music source (e.g. Spotify, Apple Music, iTunes, YouTube, Amazon, Napster, Google Music, and the like). In another step, in response to the user input for visual media selection, the computer initiates an upload of the user's selection to the BLKBOX host server, where it is assigned a URL. In another step, in response to the user input for song selection, the computer uploads the song URL (obtained from the external music source) to the BLKBOX host server. In another step, the BLKBOX application pairs the URLs of the selected visual media and the selected song. In another step, upon receiving a request from a user to view the paired content, the URL of the selected visual media and the URL of the selected song are streamed simultaneously but separately from the BLKBOX host server to the user's communication device, which the user may interact with (e.g. view, "Like", comment, share), using the BLKBOX application described herein.

BRIEF DESCRIPTION OF THE DRAWINGS

Many advantages of the present disclosure will be apparent to those skilled in the art with a reading of this specification in conjunction with the attached drawings, wherein like reference numerals are applied to like elements and wherein:

FIGS. 27-28 are example user profile pages forming part of the music-based social networking application of FIG. 1;

FIG. 29 is an example Followers list GUI screen forming part of the music-based social networking application of FIG. 1;

FIG. 30 is another example of a user profile page forming part of the music-based social networking application of FIG. 1;

FIG. 31 is an example of a music search GUI screen forming part of the music-based social networking application of FIG. 1;

FIG. 32 is an example of a post search GUI screen forming part of the music-based social networking application of FIG. 1;

FIG. 33 is an example of a tags search GUI screen forming part of the music-based social networking application of FIG. 1;

FIG. 34 is an example of a user search GUI screen forming part of the music-based social networking application of FIG. 1;

FIGS. 35-41 are example so GUI screens related to posting paired music and visual content, forming part of the music-based social networking application of FIG. 1.

DESCRIPTION OF THE PREFERRED EMBODIMENT

Figure 1:
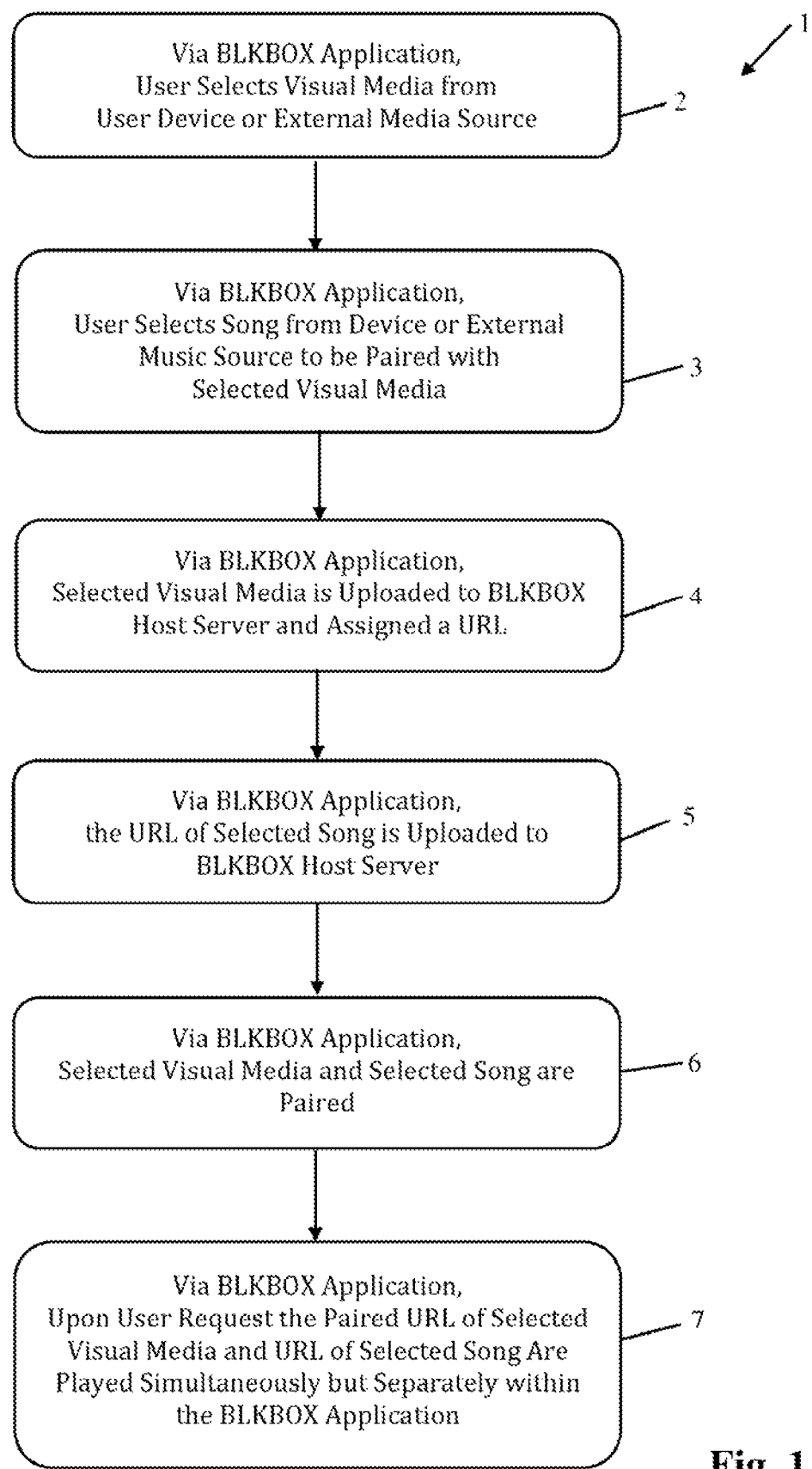
FIG. 1 is a flowchart illustrating the general steps involved in using an exemplary music-based social networking application according to an aspect of the disclosure to create and share paired content according to one example embodiment.

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure. The music-based social networking application disclosed herein boasts a variety of inventive features and components that warrant patent protection, both individually and in combination.

The present disclosure describes a music-based social networking application (named "BLKBOX") for personal communications devices (e.g. computers and mobile devices), comprising a social network, music/media player, and music discovery platform. The application software (also referred to herein as "app" and "BLKBOX app") is presented as a user interface on communications devices that offers social networking tools, music discovery from connected user suggestions and posts, music discovery and suggestion from a proprietary algorithm, and streaming music paired with streaming user media content (e.g. videos, pictures, GIFs) with editing capabilities. The application software aggregates major streaming music libraries (e.g. including but not limited to Spotify, Apple Music, iTunes, YouTube, Amazon, Napster, Google Music, and the like) and pulls from their libraries into the functionality of the app. Users may post a song, music video, or paired content (e.g. music paired with original media content) to the public feed where other users may "like", share, and/or comment related to the post. Additionally, users may share music to external social media outlets, for example Facebook, Twitter, etc. Users can send private messages, buy the song on digital music stores (e.g. iTunes, Spotify, AmazonMP3, Google Music, eMusic, Napster, etc.), and share with other users and non-users via SMS and/or email.

As used herein, "user media" or "user media content" refers to any digital media capable of being posted, streamed or paired by the application of the present disclosure, including but not necessary limited to currently available digital media types (e.g. videos, photographs, live-streaming video, GIFs, etc. . . . ) as well as later-developed types of digital media. Such content may be generated by the user and/or otherwise owned, licensed or available to the user.

As used herein, "pairing" refers to the process of associating streaming music from an external music source with user media content uploaded to or otherwise available within the application (e.g. video, picture, etc. . . . ) such that the streamed music and uploaded user media content are presented in parallel, that is, simultaneously but separately on two (2) Uniform Resource Locators (URLs)—one URL for the streamed music, one URL for the uploaded user media content. Optionally, additional URLs may also be used to play or present additional content (e.g. music, media or otherwise) simultaneously along with the streamed music of URL-1 and uploaded user media content of URL-2. In either embodiment (2 URLs with or without additional URLs), it is important to note that the streamed music and user content are not "combined" to make a new work of art, but rather each work is presented unchanged but in parallel. Once created, the "paired content" can then be shared within the user interface of the app of the present disclosure, for example as a unique way of sharing life moments set to music to create a "Soundtrack of Your Life."

The term "app" is a shortening of the term "application software," which is a set of one or more programs designed to carry out operations for a specific application. Apps are usually available through application distribution platforms, which are typically operated by the owner of the mobile operating system. Some apps are free, while others must be bought. Usually, they are downloaded from the platform to a target device, but sometimes they can be downloaded to laptops or desktop computers.

"Communications device" is defined as any computer (e.g. desktop, laptop, and/or tablet), phone, smartphone, virtual reality (VR) device, augmented reality (AR) device, personal digital assistant (PDA), or computing device that comprises a battery, display, circuit board, and processor capable of processing or executing software.

A graphic user interface ("GUI") allows users to interact with communications devices through icons and other visual indicators such as secondary notation, as opposed to text-based interfaces, typed command labels or text navigation.

A "smartphone" (or "smart phone") is a mobile telephone with more advanced computing capability and connectivity than basic feature phones. Smartphones typically include the features of a telephone combined with one or more features of other popular consumer devices, for example including but not limited to a personal digital assistant, media player, digital camera, and/or a GPS navigation unit. Smartphones may also include features such as a touchscreen interface, web browsing, broadband network radio (e.g. LTE), Wi-Fi, 3rd-party apps, motion sensor and/or mobile payment.

FIG. 1 is a flowchart 1 illustrating the general steps involved in using the BLKBOX application of the present disclosure to create and share paired content according to one example embodiment. Not all steps are required to be performed in the order shown. A user selects (in step 2) visual media (e.g. picture, video, live-stream, GIF, etc.) from the user's communications device or an external media source using the graphic user interface (GUI) of the BLKBOX application. The user in step 3 (using the GUI of the BLKBOX application) selects a song to be paired with the selected visual media from the user's communications device or an external streaming music source (e.g. Spotify, Apple Music, iTunes, YouTube, Amazon, Napster, Google Music, and the like). In step 4, in response to the user input (e.g. visual media selection), the computer initiates an upload of the user's selection to the BLKBOX host server, where it is assigned a URL. In step 5, in response to the user input (e.g. song selection), the computer uploads the song URL (obtained from the external music source) to the BLKBOX host server. In step 6, the BLKBOX application pairs the URLs of the selected visual media and the selected song. In step 7, upon receiving a request from a user to view the paired content, the URL of the selected visual media and the URL of the selected song are streamed simultaneously but separately from the BLKBOX host server to the user's communication device, which the user may view using the BLKBOX application described herein.

Figure 2:
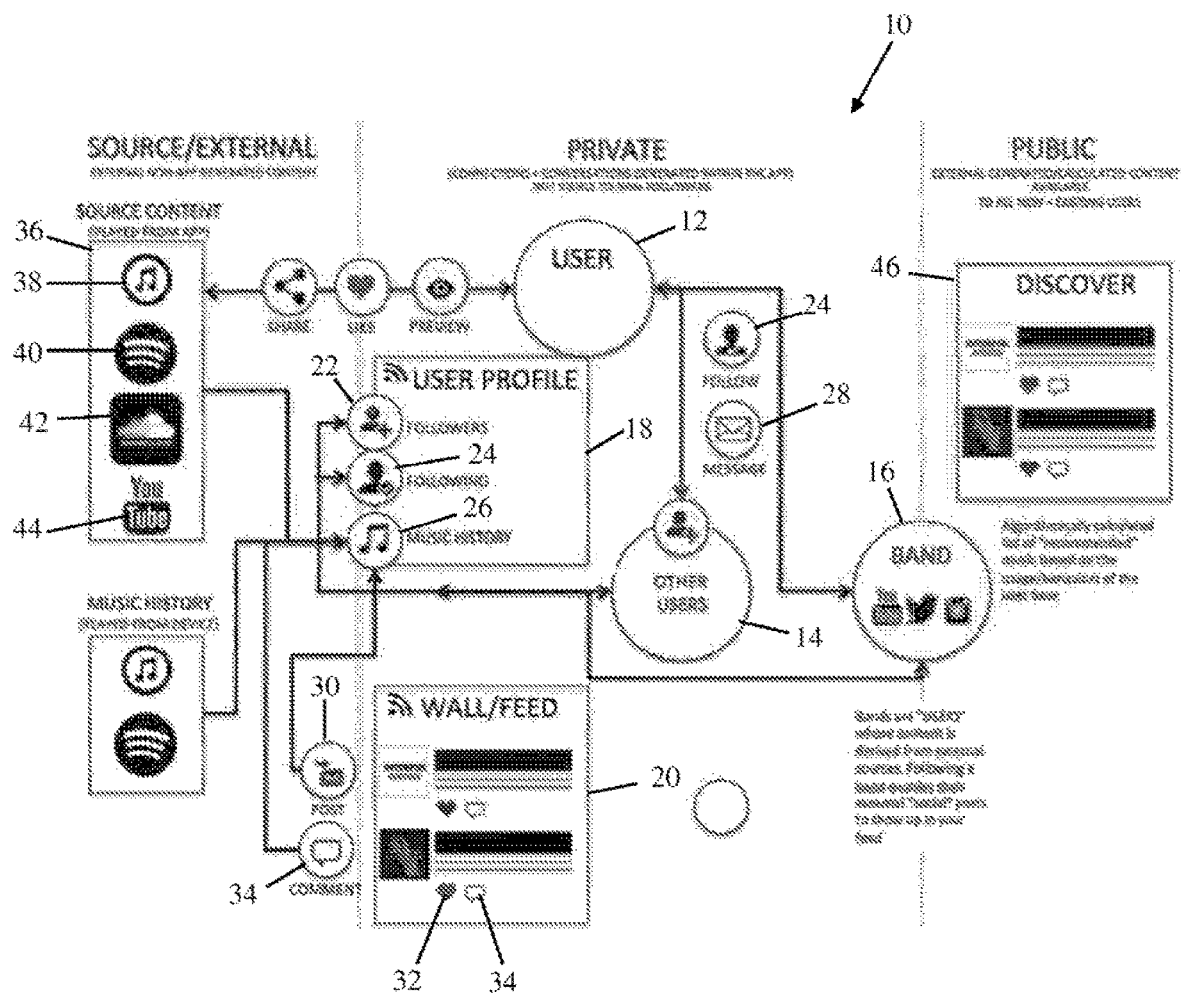
FIG. 2 is a block diagram illustrating one example of the music-based social networking application of FIG. 1.

FIG. 2 is a block diagram of an example music-based social network application 10 according to the present disclosure, illustrating in particular how the various parties (e.g. a user 12, other users 14, bands 16, etc.) access and share content. By way of example, the user 12 has a user profile 18 and a "feed" 20 (also sometimes referred to as "wall"). The user profile 18 includes, among other things, a "Followers" list 22 (e.g. the names and/or number of other users 14 who have elected to "follow" the user 12), a "Following" list 24 (e.g. the name and/or number of other users 14 that the user 12 is following), and a "Music History" list 26 (e.g. a list of songs and/or music videos that the user 12 has viewed/listened to either on the user's communications device or from external sources).

The user profile 18 remains private to the user 12 until they begin adding "friends" (e.g. other users 14 who have elected to "follow" the user 12), which in turn can share the user's 12 posts to other friends in the network, and so on. The user 12 can privately view and edit their own user profile 18. As will be explained in further detail below, the user 12 can see who, in their social network, has commented, liked or re-shared their activity via notifications, as well as send direct private messages 28 to other users 14 in their social network. In addition, the user 12 can privately view other users' 14 profiles to determine whether or not they want to follow or accept their invitation to join their social network. The user's musical history 26 (which is generated from music they have listened to on their device) is also private to the user 12. The user 12 can choose whether to make their music history 26 public by "posting" 30 (e.g. sharing) to their feed 20. When a user posts 30 at least a portion of their music history 26 to their feed 20, that post 30 also appears in the feeds of the followers 22 of the user 12, which enable the followers 22 to "like" 32 the post and/or "comment" 34 on the post. Only the user can view their own feed 20, which is a compilation of all the music shared within their social network (e.g. by the user 12, another user 14 that the user 12 is following 24, anyone that the followed other user 14 is following, and so on), making each 'feed' 20 unique to the user 12.

Figure 3:
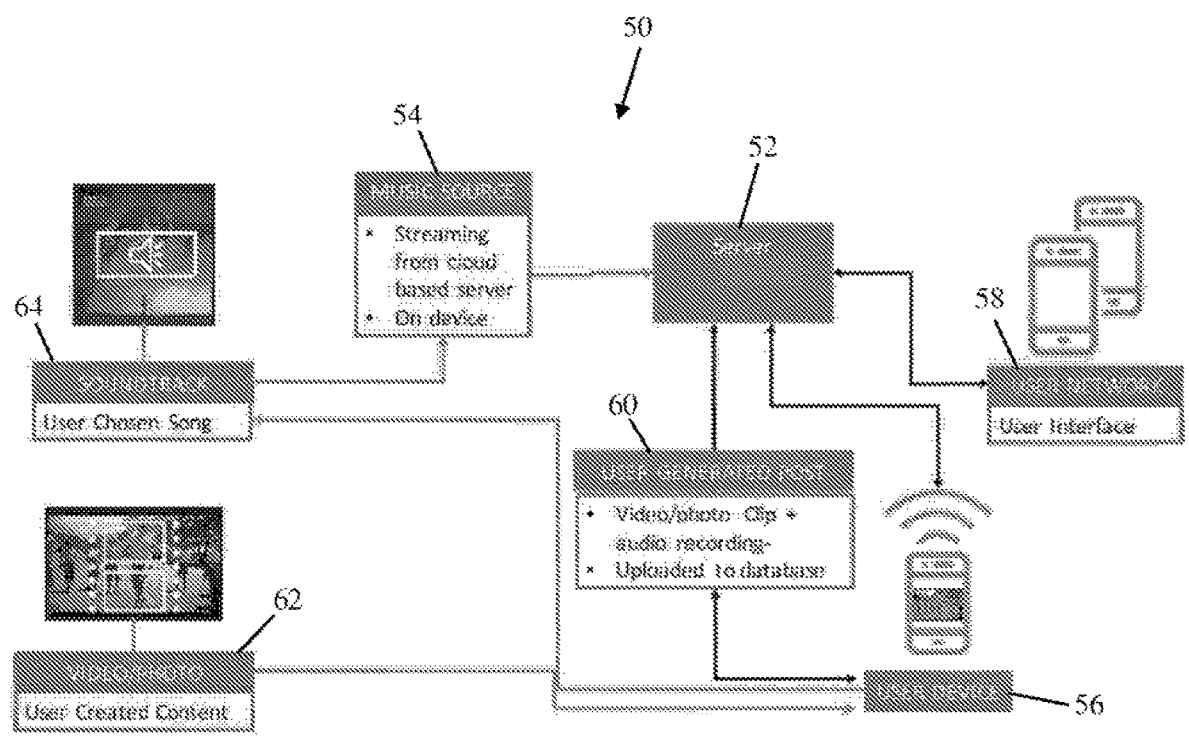
FIG. 3 is a block diagram illustrating a method of pairing user-generated visual content with streaming music content, and then sharing the paired content with other users, forming part of the music-based social networking application of FIG. 1.

When a user posts 30 at least a portion of their music history 26 to their feed 20, the user is not uploading an actual sound file to be downloaded, but rather the user 12 is sending a request for streaming music content to a host server (see, e.g. FIG. 3). The music content is generated through an application program interface (API) with an external source 36 (e.g. Apple Music 38, Spotify 40, Soundcloud 42, YouTube 44, and the like) to create a stream from that external source 36 to the host server. The host server then makes the stream available to the user's 12 profile where the user 12 can then share with their community on the app through the post 30.

The "Band" profile 16 is a unique profile created by artists (bands, songwriters, DJ's, etc) that will be verified as the "official" profile of that artist. The user 12 can follow 24 their favorite artists and be able to see what their favorite artists are currently listening to, as well as give the opportunity for any artist to upload their own music to the host server (if it's not available on an API external music source 36) to be stored, and then can be shared within their social network 10.

The app also includes a public "recommended" feed 46 that comprises externally generated, calculated content that is available to all new and existing users. The public feed 46 is an algorithmically calculated list of "recommended" music based on the usage/behavior of the user base.

FIG. 3 is a block diagram illustrating a subscriber management system 50 for generating paired content (e.g. streaming music paired with streaming user-generated visual media content) according to an aspect of the disclosure. By way of example, the subscriber management system 50 includes a host server 52, music source 54, a user's communications device 56, and a user network 58. Generally, when the user 12 wants to generate a paired content post 60, the user 12 selects the visual media content 62 (e.g. photo, video, etc. . . . ) from a location on their own communications device 56, for example from the "camera roll" or from another visual media folder within their device. This visual media content 62 is uploaded to the server 52. The user 12 uses the app's user interface to also select a song 64 that they wish to pair with the visual media 62. The streaming URL of the selected song, along with song meta-data (e.g. song title, artist, album, etc. . . . ) are uploaded to the server 52, which then connects with the music source 54 (e.g. user device 56, server 52, or external source 36) to generate a stream of the song to be paired with the visual media 62. Connected users within the network 58 can view the paired content on the network social feed or other locations in the network 58 interface. The paired content can be shared within the app or externally if the user has obtained the rights from the music or video content owner. This process will be explained in greater detail below with reference to the specific user interface screens within the app that are involved in the pairing process. In the case where the visual media content is live-streaming video (vs. photos or videos resident on the user's communications device 12), the application may upload the URL of the live video feed/stream along with optional metadata associated with the live-video stream.

FIGS. 4-41 are exemplary GUI screens of the music-based social networking application according to an aspect of the disclosure. The various GUI screens are presented to the user by the application software on the user's communications device (e.g. smartphone, tablet computer, laptop computer, desktop computer, virtual reality (VR) device, augmented reality (AR) device, and personal data assistant, etc.). It should be noted as an initial matter that reference herein to "computer" refers to the computer operating the application software located within the user's communications device. Discussion herein of users pressing buttons (or tapping icons) and being directed by the computer to different screens includes the computer determining that user input was received at a location that corresponds to a display of a particular user interface element (e.g., a "button" or an "icon") and in response, and sometimes without receipt of further user input, transitioning the display of the computer from a first user interface screen to a second user interface screen. Furthermore, although the pressing of buttons (or tapping of icons) indicates the presence of a touchscreen interface, it is to be understood that certain communications devices that may operate the application software of the present disclosure may not be equipped with a touchscreen interface and therefore the pressing of buttons may be achieved by another suitable way, such as using a mouse to direct a pointer to the correct spot on the screen and then "clicking" the mouse button. In response to the user input, the computer then performs additional actions, for example switching GUI screens, communicating with the host server, etc.

Figure 4:
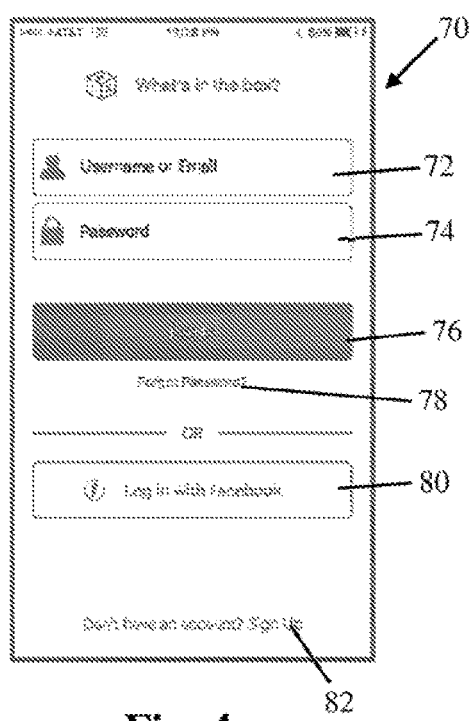
FIG. 4 is an exemplary initial graphic user interface ("GUI") screen prompting a user to log in to or sign up for the music-based social networking application, forming part of the music-based social networking application of FIG. 1.

FIG. 4 is an example of a "login homepage" GUI screen 70 of the music-based social networking application according to an aspect of the disclosure, and represents the initial GUI screen that a user will encounter after starting the application software. By way of example, the login homepage GUI screen 70 includes a name field 72, password field 74, a "Log In" button 76, a "Forgot password" link 78, a "Log In with Facebook" button 80, and a "Sign up" link 82. Returning users who have already registered with the app may gain access to the software using either a username or email address with a password, or alternatively through a Facebook log in procedure.

To log in using a username (or email address) and password (for example if the user does not have a Facebook account), the user inputs their username (chosen during sign up) or email address in the name field 72 and their chosen in the password field 74. By way of example, tapping on either the name field 72 or the password field 74 causes the communications device to present a popup virtual keyboard (not shown), enabling the user to input the required information through interaction with the virtual keyboard. After populating the name field 72 and password field 74 with the correct information, the user presses the "Log In" button 76 (e.g., by contacting a location on the display at which the communications device presents the "Log In" button 76). The computer verifies the authentication data against a list of registered users and if the authentication data matches, the computer advances the user to their Feed Homepage 162 (FIG. 13), which the communications device presents in response to determining that the correct authentication data was entered.

Figure 5:
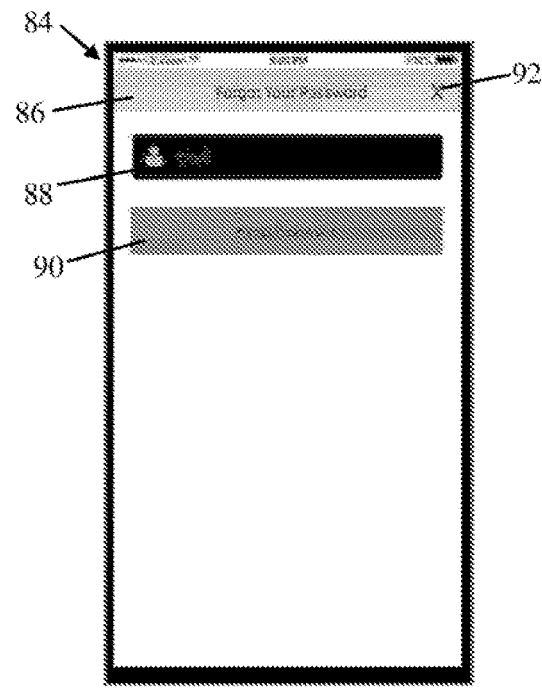
FIGS. 5-6 are examples of GUI screens related to resetting a user's password, forming part of the music-based social networking application of FIG. 1.
Figure 6:
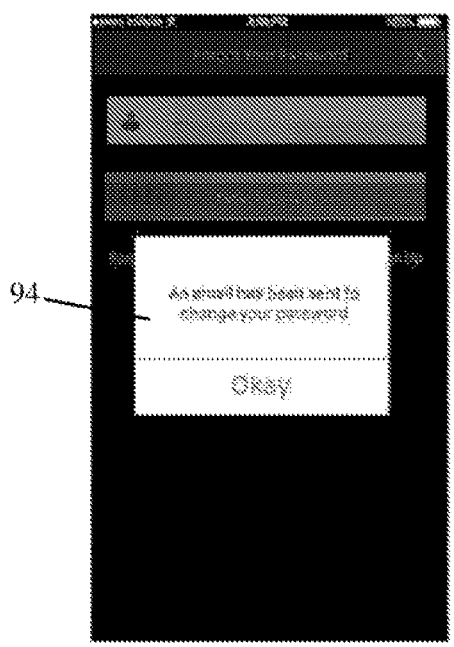
Figure 7:
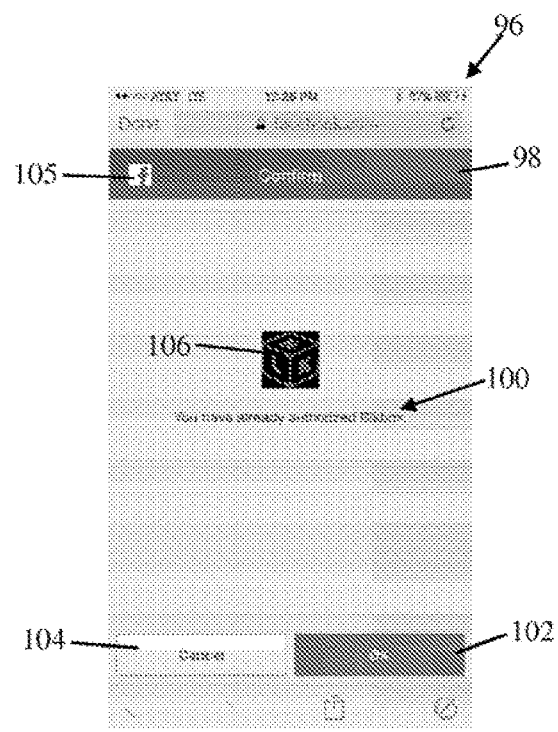
FIGS. 7-8 are examples of GUI screens related to logging into the application through Facebook, forming part of the music-based social networking application of FIG. 1.
Figure 8:
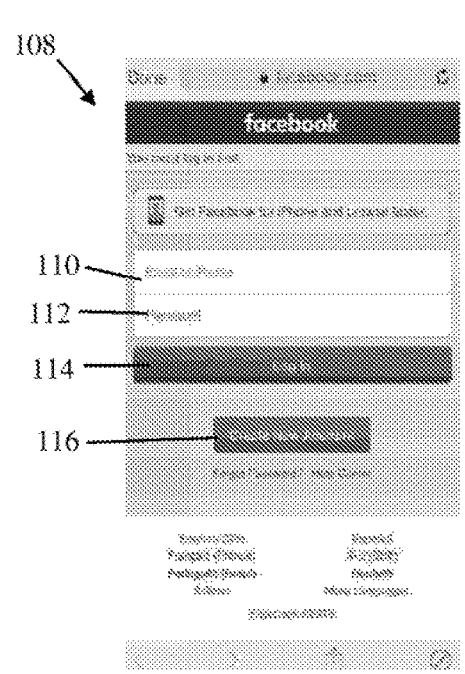

If the user cannot remember their chosen password, the user may tap on the "forgot password" link 78, which prompts the computer to direct the user to the "Forgot Your Password" GUI screen 84 (FIG. 5). The "Forgot Your Password" GUI screen 84 includes a header 86, email field 88, a "Reset Password" button 90. The header 86 is positioned at the top of the screen and includes the screen title and a "X" icon 92. Tapping the "X" icon 92 once prompts the computer to direct the user to the Login Homepage 70. Tapping on the email field 88 causes the communications device to present a popup virtual keyboard (not shown), enabling the user to input the email address that they used during signup through interaction with the virtual keyboard. The user then taps the "Reset Password" button 90 once, which in turn causes the computer to verify whether the entered email address is valid. If the computer matches the entered email address to a registered user account, then the computer sends an email to the user containing a link to reset their password, and displays a confirmation popup message 94 (e.g. "An email has been sent to change your password") as shown by way of example in FIG. 6. If the computer is unable to match the entered email address to a registered user account, then an error message will be displayed. The user can then enter a different email address into the email field 88 or tap the "X" icon 92 to return to the Login Homepage 70 and instead follow through the signup procedure to register as a new user.

Referring again to FIG. 4, if the user is also a registered user of Facebook social networking platform, they may choose to link their BLKBOX profile with their Facebook profile which allows the BLKBOX app access to the user's Facebook public profile (including profile picture), friends list (optional), and email address (optional), but may not allow BLKBOX to post to their Facebook feed. If the user is already signed into Facebook on their device, then tapping the "Log in With Facebook" button 80 prompts the computer to direct the user to the "Facebook Confirm" GUI screen 96, shown by way of example in FIG. 7, which is located on the facebook.com website (or in the Facebook app). The Facebook Confirm screen 96 includes a header bar 98, confirmation message 100, an "OK" button 102, and a "Cancel" link 104. By way of example, the header bar 98 is located at the top of the page and includes the Facebook logo 105 and the title of the GUI screen (e.g. "Confirm"). The confirmation message 100 includes a BLKBOX logo 106 and a message confirming that the user has already authorized BLKBOX to link with their Facebook account. Tapping on the "OK" button prompts the computer to direct the user to their Feed Homepage 162 (FIG. 13), which the communications device presents in response to determining that the correct authentication data was entered (as relayed by Facebook).

Figure 13:
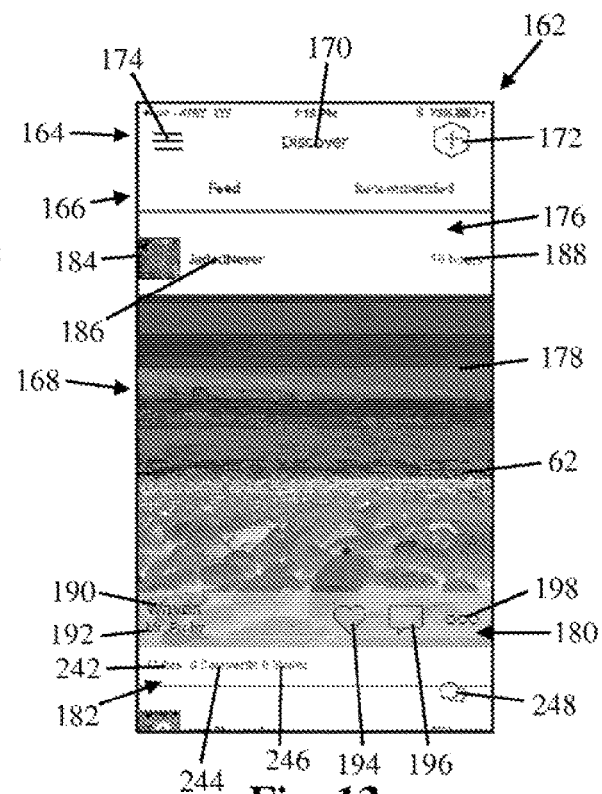
FIG. 13 is an example "Feed Homepage" GUI screen forming part of the music-based social networking application of FIG. 1.

If the user is not already signed into Facebook on their device, then tapping the "Log in With Facebook" button 80 prompts the computer to direct the user to the Facebook Log in GUI screen 108 (FIG. 8), which is controlled by Facebook. The Facebook Log in GUI screen 108 includes an email/phone field 110, password field 112, "Log In" button 114, and a "Create New account" button 116. By way of example, tapping on either the email/phone field 110 or the password field 112 causes the communications device to present a popup virtual keyboard (not shown), enabling the user to input the required information through interaction with the virtual keyboard. After populating the email/phone field 110 and password field 112 with the correct information, the user presses the "Log In" button 114 (e.g., by contacting a location on the display at which the communications device presents the "Log In" button 114. The Facebook server verifies the authentication data against a list of registered users and if the authentication data matches, the Facebook server redirects the user to the BLKBOX app, which directs the user to their Feed Homepage 162 (FIG. 13). Users without a Facebook account may elect to create on by following the prompts after tapping the "Create New Account" button 116. After the new account is created, the user is redirected to the BLKBOX app.

Figure 9:
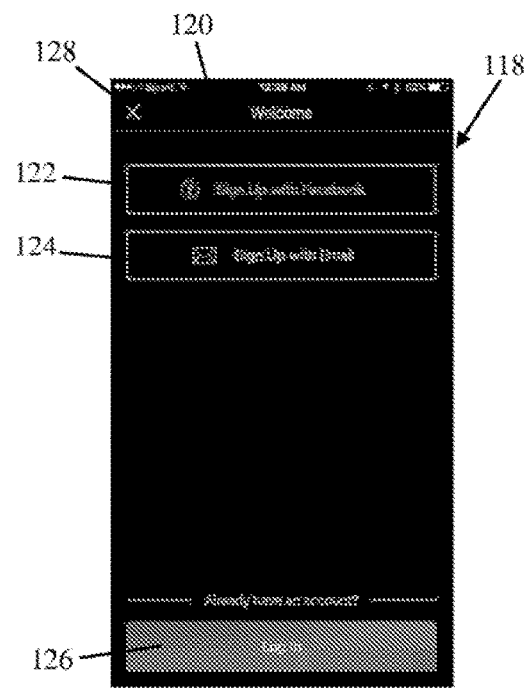
FIG. 9 is an example of an initial "Sign Up" GUI screen forming part of the music-based social networking application of FIG. 1.
Figure 10:
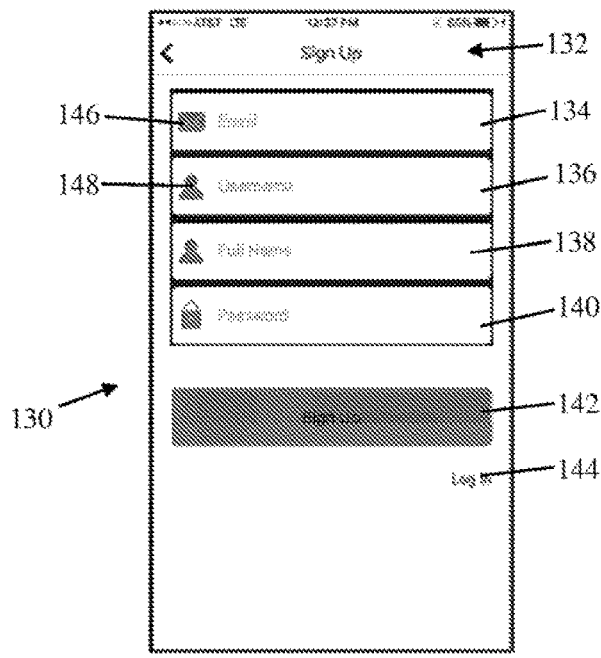
FIGS. 10-12 are example GUI screens related to signing up for the music-based social networking application, forming part of the music-based social networking application of FIG. 1.
Figure 11:
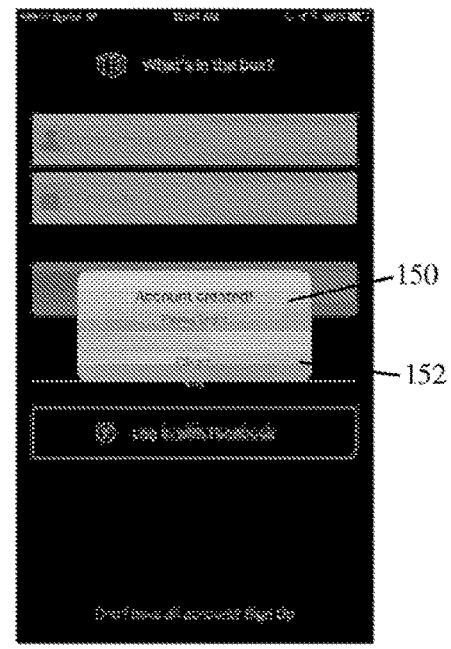

Referring again to FIG. 4, if the user has not previously registered with the BLKBOX app, then the user will tap on the "Sign Up" link 82 positioned at the bottom (by way of example) of the Log In Homepage 70. Tapping on the "Sign Up" link 82 prompts the computer to direct the user to the initial "Sign Up" GUI screen 118 (FIG. 9). The initial "Sign Up" screen 118 includes (by way of example) a header bar 120, a "Sign Up with Email" button 122, a "Sign Up with Facebook" button 124, and a "Log In" button 126. The header bar 120 may include a welcome message (e.g. "Welcome") and an "X" icon 128. Tapping the "X" icon 128 once prompts the computer to direct the user to the Log In Homepage 70. Tapping the "Sign Up with Email" button 122 prompts the computer to direct the user to the "Sign Up with Email" GUI screen 130 (FIG. 10). Tapping the "Sign Up with Facebook" button 124 prompts the computer to direct the user to a Facebook confirmation screen like the confirmation screen 96 described above (if the user is already signed into Facebook on their device), or to the Facebook Log In screen 108 (if the user is not already signed into Facebook on their device). Tapping the "Log In" button 126 prompts the computer to direct the user to the Log In Homepage 70, where the user may log in as previously described.

FIG. 10 illustrates an example of a "Sign Up with Email" GUI screen 130 according to one aspect of the disclosure. By way of example, the "Sign Up with Email" GUI screen 130 includes a header bar 132, email form field 134, Username form field 136, full name form field 138, password form field 140, "Sign Up" button 142, and a Log In link 144 (which the user may tap to be directed back to the Log In Hompage 70). The header bar 132 includes a screen title (e.g. "Sign Up") and a "back" icon 146 in the form of a left-facing arrow (for example) that when tapped prompts the computer to direct the user to the previous GUI screen. By way of example, tapping on any one of the email form field 134, username form field 136, full name form field 138, or password form field 140 causes the communications device to present a popup virtual keyboard (not shown), enabling the user to input the required information through interaction with the virtual keyboard. After populating the email form field 134, username form field 136, full name form field 138, and password form field 140 with the required information, the user presses the "Sign Up" button 142 (e.g., by contacting a location on the display at which the communications device presents the "Sign Up" button 142). Since a user's email address and username must be unique system-wide, the computer verifies the entered data against a list of registered users and if the entered data matches, the computer alerts the user to this fact. For example, if an email address that is entered into the email form field 134 is already in use within the application software, the computer may alert the user to this fact by causing an icon 146 (e.g. envelope icon) positioned next to the email form field 134 to change color, for example from gray to red. If a username that is entered into the username form field 136 is already in use within the application software, the computer may alert the user to this fact by causing an icon 146 (e.g. person icon) positioned next to the username form field 136 to change color, for example from gray to red. If the computer does not find any matches, the application software creates the users account and displays a popup notification 150 (FIG. 11) communicating a successful account sign up to the user. Upon tapping an "Okay" button 152, the computer is prompted to direct the user to the Log In Homepage 70 where the user can enter his/her chosen log in information to gain access to the app.

Figure 12:
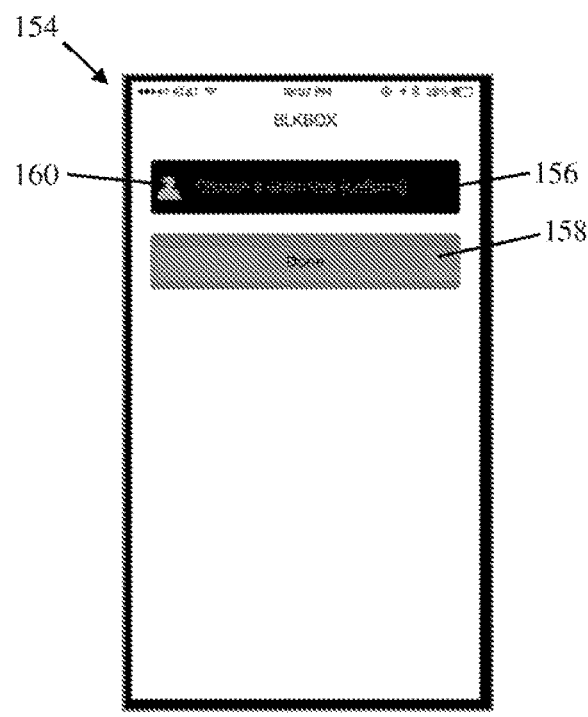

If a user elected to sign up with Facebook, then after the user signs in (or signs up) with Facebook as previously described, the computer presents the user with the account setup GUI screen 154, shown by way of example in FIG. 12. The account setup screen 154 in this instance includes a username form field 156 and a "Done" button 158. Other profile information (e.g. name, email address, etc.) is imported from Facebook, and as such the user does not need to enter that information into the BLKBOX app. By way of example, tapping on the username form field 156 causes the communications device to present a popup virtual keyboard (not shown), enabling the user to input a chosen unique username through interaction with the virtual keyboard. After populating the username form field 156 with a chosen username, the user presses the "Done" button 158 (e.g., by contacting a location on the display at which the communications device presents the "Done" button 158). The computer verifies the username data against a list of registered users and if the username that is entered into the username form field 156 is already in use within the application software, the computer may alert the user to this fact by causing an icon 160 (e.g. person icon) positioned next to the username form field 156 to change color, for example for example from gray to red. If the computer does not find any matches, the application software creates the users account and advances the user to their Feed Homepage 162 (FIG. 13).

FIG. 13 is an example of a user's "feed homepage" GUI screen 162 of the music-based social networking application according to an aspect of the disclosure, and represents the initial GUI screen that a user will encounter after successfully logging onto the application software. By way of example only, the feed homepage 162 includes a header bar 164, toggle bar 166, and a post window 168. The header bar 164 is positioned at the top of the screen and includes a name (e.g. "Discover" or "BLKBOX"), a "post" icon 172, and a "menu" icon 174. The "post" icon 172 is shown by way of example of a "+" sign inside of a hexagon, however any suitable icon may be used. Tapping the "post" icon 172 prompts the computer to direct the user to the initial "New Post" GUI screen 464 (FIG. 35) to proceed with the new post workflow, which will be described in detail further below. Tapping the "menu" icon 174 prompts the computer to present the user with the main menu 314 (e.g. sliding from the left of the screen). The main menu 314 presents the user with several navigation options including Find Friends 316, Notifications 318, Messages 320, My Profile 322, Search 324, New Post 326, Settings 328, and Logout 330, each of which will be described in further detail below in relation to FIG. 21.

In the present example, the toggle bar 166 is positioned directly below the header bar 164 and includes a "Feed" toggle button 176 and "Recommended" toggle button 178. The toggle buttons 176, 178 allow the user to toggle between viewing their own feed 20 and the "recommended" feed 46 (e.g. FIG. 20) by tapping on either the "Feed" toggle button 176 or the "Recommended" toggle button 178. When selected, the particular toggle button may have an associated visual indicator for the computer to alert the user which toggle is selected. By way of example, the selected toggle button may be illuminated with a certain color (e.g. blue). As mentioned previously (with respect to FIG. 2), only the user can view their own feed 20, which is a compilation of all the music shared within their social network (e.g. by the user 12, another user 14 that the user 12 is following 24, anyone that the followed other user 14 is following, and so on), making each 'feed' 20 unique to the user 12. The "recommended" feed 46 comprises externally generated, calculated content that is available to all new and existing users. The public "recommended" feed 46 is an algorithmically calculated list of "recommended" music/posts based on the usage/behavior of the user base.

The post window 168 in the present example is positioned beneath the toggle bar 166 and occupies most of the remaining portion of the display screen. The post window 168 includes a user information bar 176, a content window 178, an action bar 180, and a stats bar 182. The post window 168 is scrollable (for example up-down or left-right) to enable a user to browse through numerous posts on the feed. By way of example, this scrolling movement may be accomplished by the user pressing his/her finger on the post window 168 and then dragging his/her finger to a new location on the display screen. In response, the computer causes the image displayed on the post window to change to the image associated with the next post. The user may continue to scroll until he/she finds a post they want to view. By way of example, the user information bar 176 is positioned at the top of the post window 168 and includes a thumbnail image 184 of the posting user's profile picture, the posting user's name 186, and a time indicator 188 that indicates how long ago the post was made. Tapping on the thumbnail image 184 prompts the computer to direct the user to the posting user's profile page 408 (e.g. FIG. 30). Optionally, the user information bar 176 may also display the geolocation of the posting user when the post was made.

The content window 178 displays the visual media 62 component (e.g. still image, video, GIF) of the paired content post. When the user taps once on the content window 178, the computer will play the music stream associated with the visual media 62. In the case of a video comprising the visual media content, tapping the content window once 178 also causes the computer to play the associated video. Tapping the content window a second time causes the computer to stop the music stream associated with the visual media 62 and, in the case of video media, also causes the computer to stop playing the video. The computer will also stop playing the paired content if the user scrolls past the post that the computer is currently playing. The computer will not start playing the paired content automatically. The user must take action prompting the computer to start the play. Once started, the paired content clip will loop continuously until the user taps the content window 178 or scrolls the post window 168 away from the current post. The duration of the streamed music may be provided in any number of suitable or desired manners. For example, the duration of the streamed music may be a pre-set or standard duration (e.g. 15 seconds or 30 seconds) to abide by the "Fair Use" provisions of associated copyright laws, such as if the user does not have a premium subscription to the streaming music source and cannot legally stream the entirety of the selected song. In another example, the duration of the streamed music may be a user-selected duration (e.g. 10 seconds, 20 second, 30 seconds, full song, etc. . . . ) depending upon their streaming music source subscription. Although not shown, the application may allow a user to select between using "pre-set" streaming duration(s) and a "user-selected" duration of the music streaming.

The action bar 180 by way of example is positioned at the bottom of the post window 168 and includes the song name 190, artist 192, a "Like" icon 194, "Comments" icon 196, and a "Share" icon 198. The "Like" icon 194 is shown by way of example as a heart-shaped image, however other images may be used. When a user taps on the "Like" icon 194, the computer registers that the user likes the post and causes the "Like" icon 194 to illuminate, for example in a red color. The "Like" incident is also tallied and displayed in the stats bar 182.

If the viewing user wants to give additional feedback to the posting user, the viewing user may tap on the "Comments" icon 196, shown by way of example as a conversation bubble. Tapping on the "Comments" icon 196 prompts the computer to direct the user to the Comments GUI screen 200, shown by way of example in FIGS. 14-15. The Comments GUI screen 200 includes a header 202, body section 204, and comments section 206. The header 202 is positioned at the top of the screen and includes the screen title and a "X" icon 208 (or alternatively an left-facing arrow icon). Tapping the "X" icon 208 once prompts the computer to direct the user to the previous screen. The body section 204 includes a thumbnail image 210 of the visual media component of the shared post, along with certain identifying information relating to the music component of the shared post, for example including but not limited to song title, band name, and album. The posting user may also add a comment about their own post (e.g. 100 characters maximum) in the body section 204. The comments section 206 displays each comment associated with the post in chronological order with the most recent on top. User comments include the commenting user's username 210, thumbnail image of the user's profile picture 212, comment text 214, and a time indicator 216 that indicates how long ago the comment was made. Tapping on the thumbnail image 212 prompts the computer to direct the user to the commenting user's profile page 408 (e.g. FIG. 30). The comments section 206 further includes a text form field 218 and a "Post" button 220. Tapping on the text form field 218 causes the communications device to present a popup virtual keyboard 222 (FIG. 15), enabling the user to input the comment that they wish to leave through interaction with the virtual keyboard. The user then taps the "Post" button 220 once, which in turn causes the computer to post the comment to the comments section 206.

Figure 16:
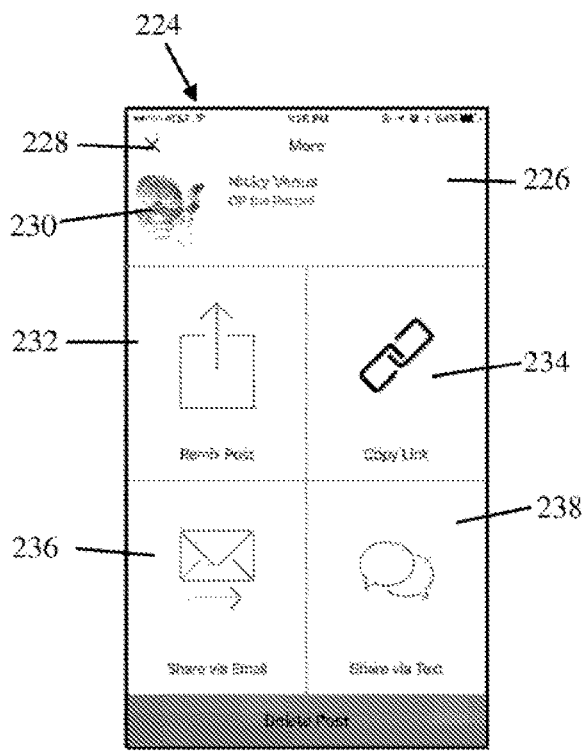
FIG. 16 is an example "Share" GUI screen forming part of the music-based social networking application of FIG. 1.

If the viewing user really likes the post, they may want their friends to see it. Tapping the share icon 198 (FIG. 13) prompts the computer to direct the user to the Share GUI screen 224 (FIG. 16). The Share GUI screen 224 includes a header bar 226 positioned at the top of the screen and including the screen title and a "X" icon 228 (or alternatively an left-facing arrow icon). Tapping the "X" icon 228 once prompts the computer to direct the user to the previous screen (e.g. Feed Homepage 162). The header bar 226 further includes a thumbnail representation 230 of the visual media component of the shared post, along with certain identifying information relating to the music component of the shared post, for example including but not limited to song title, band name, and album.

The Share GUI screen 224 further includes a number of actions for the viewing user to take, including for example "Remix Post" 232, "Copy Link" 234, "Share via Email" 236, and "Share via Text" 238. Tapping on the "Remix Post" 232 option prompts the computer to direct the user to the New Post GUI screen 464 (FIG. 37) wherein the music selection and visual media content are pre-populated with existing post's content, but the sharing user now has the opportunity to change the post, either by replacing the visual content or changing the song. Tapping the "Copy Link" 234 option causes the computer to copy the post's underlying URL to the communications device's clipboard to enable the user to paste the post's URL into any external sharing venue, for example including but not limited to Facebook, Twitter, Instagram, Internet message boards, email programs, messaging applications, etc. Tapping on the "Share via Email" 236 option prompts the computer to open the communications device's default email program, initiate a new outgoing email, pre-populate the Subject line with a short message (e.g. "Check out this post on BLKBOX"), and pre-populate the message body with a hyperlink to the copied URL. The user enters the email recipients into the "To:" field and sends as a normal email. The recipient may open the email on any Internet-enabled device, and then click (or tap) on the provided hyperlink to view the shared content. Tapping on the "Share via Text" 238 option prompts the computer to open the communications device's default text messaging program, initiate a new outgoing text message, and pre-populate the message body with a short message (e.g. "Check out this post on BLKBOX") and a hyperlink to the copied URL. The user enters the message recipients into the "To:" field and sends as a normal text message. The recipient may open the text message on any SMS-enabled device, and then click (or tap) on the provided hyperlink to view the shared content.

A radio button 240 may be positioned at the bottom of the Share GUI screen 224 and has a different function depending on who is viewing the page. For example, if the posting user is viewing the Share GUI screen 224, the radio button 240 may be a "Delete Post" button as shown in FIG. 16. Tapping on the "Delete Post" radio button 240 prompts the computer to remove the post from the network feed (optionally upon confirmation). If someone other than the posting user is viewing the Share GUI screen 224, the radio button 240 may be a "Report Content" button (for example). Tapping on the "Report Content" button 240 prompts the computer to display a popup option menu for the user to indicate why they are flagging the posted content for removal by site administrators. By way of example only, the options may include (but are not limited to) inappropriate content, illegal activity, violence, and spam.

Figure 14:
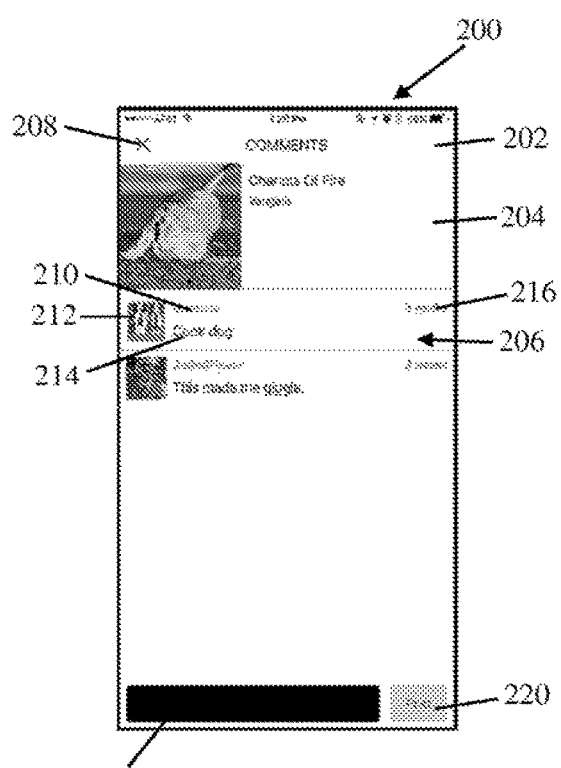
FIGS. 14-15 are example GUI screens related to commenting on user posts, forming part of the music-based social networking application of FIG. 1.
Figure 15:
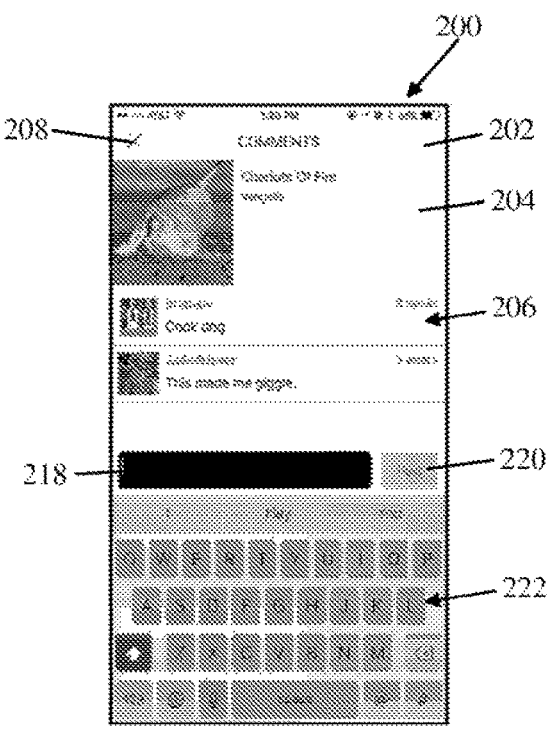

Referring again to FIG. 13, the stats bar 182 is positioned by way of example below the activity bar 180. Using the stats bar 182, the computer presents a running total of Likes 242, Comments 244, and Shares 246 (within the music-based social media network 10). If the running total is greater than zero, then tapping on the Likes running total 242 prompts the computer to direct the user to a "Likes List" GUI screen (not shown), which is very much like the "Followers List" GUI screen 382 of FIG. 29 below, except that it gives the posting user the option to "Follow" viewing users who have liked their post if the posting user is not already following them. If the running total is greater than zero, then tapping on the Comments running total 244 prompts the computer to direct the user to the Comments GUI screen 200 (FIG. 14).

The user's "feed homepage" GUI screen 162 further includes a Notifications icon 248 located by way of example at the bottom of the Feed Homepage screen 162. It is important to note that the Notifications icon 248 does not scroll with the post window 168 but rather remains static as the content presented in the post window 168 scrolls underneath. By way of example, the Notifications icon 248 is represented by a pair of conversation clouds, however any suitable image may be used. An alert number 250 (FIG. 20) is present next to the Notifications icon 248 in the event that there are new notifications since the user's last visit to the app. The alert number 250 alerts the user to both the presence and number of new notifications.

Figure 17:
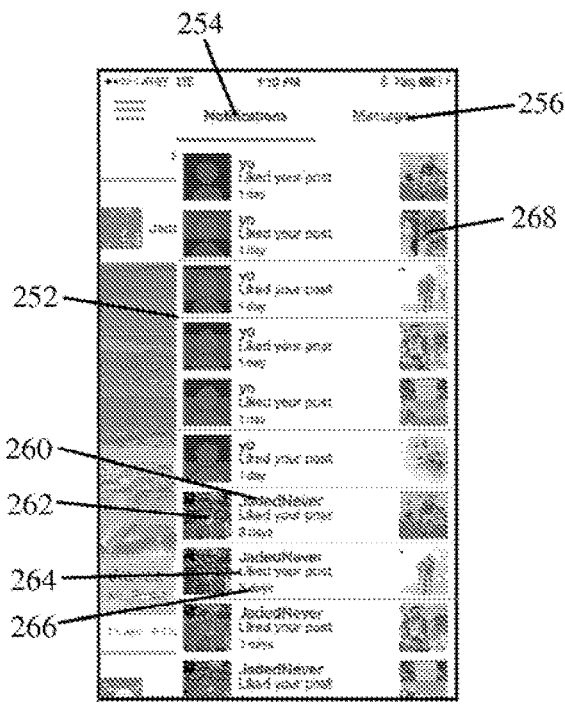
FIG. 17 is an example "Notifications" GUI screen forming part of the music-based social networking application of FIG. 1.

Tapping on the Notifications icon 248 prompts the computer to present the Notifications GUI screen 252 to the user, shown by way of example in FIG. 17. By way of example the Notifications screen 252 is a slide-out screen that overlays the Feed screen without navigating the user away from the Feed Homepage 162. The Notifications screen 252 includes a Notifications tab 254 and a Messages tab 256. When the user is presented with the Notifications screen 252, the Notifications tab 254 is highlighted (e.g. in blue color), and the list of notifications 258 is displayed. Notifications 258 show how other users interact with a user, for example whether the other users interacted with a user's post (e.g. liked, shared, commented, etc.) or whether they started to follow (or unfollow) the user. The Notifications tab 254 displays each notification 258 associated with the user in chronological order with the most recent on top. Each notification 258 includes the other user's username 260, thumbnail image of the user's profile picture 262, interaction 264 (e.g. liked, shared, commented, followed, unfollowed, etc.), a time indicator 266 indicating how long ago the interaction was made, and a thumbnail representation 268 of the post interacted with. Tapping on the thumbnail image of the user's profile picture 262 prompts the computer to direct the user to the interacting user's profile page 408 (e.g. FIG. 30). Tapping on the thumbnail representation 268 of the post prompts the computer to direct the user to the post view page associated with that post. To return to the Feed Homepage 162, the user simply taps to the left of the Notifications screen 252, which prompts the computer to hide the Notifications screen 252 and present the Feed Homepage 162.

Figure 18:
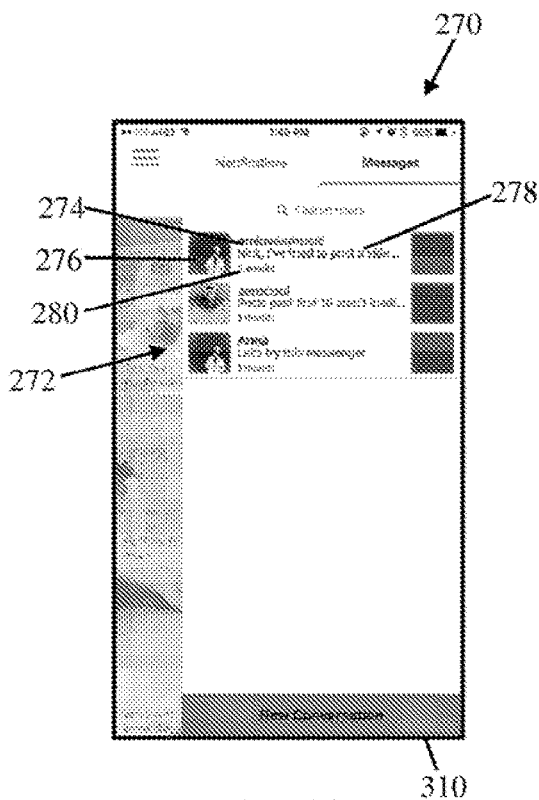
FIGS. 18-19 are example GUI screens related to private messaging within the application, forming part of the music-based social networking application of FIG. 1.

Tapping on the Messages tab 256 prompts the computer to present the Messages GUI screen 270 to the user, shown by way of example in FIG. 18. The Messages screen 270 displays a list of conversation indicators 272 between the user and other users arranged in chronological order with the conversation having the most recent message on top. The conversation indicators 272 each include the other user's username 274, thumbnail image of the user's profile picture 276, a portion of the most recent message 278, and a date indicator 280 that indicates the date of the last message in the conversation.

Figure 19:
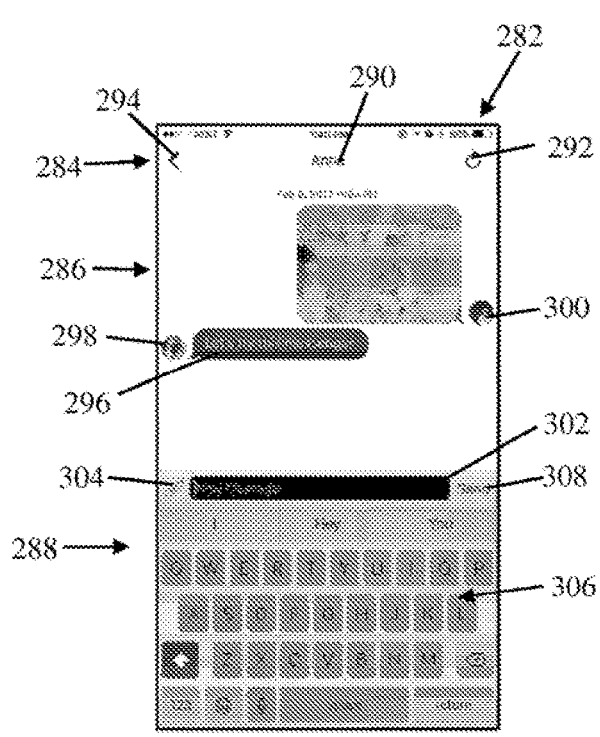

Tapping anywhere on the conversation indicator 272 prompts the computer to direct the user to the conversation page 282, shown by way of example in FIG. 19. The conversation page 282 includes a header 284, a view section 286, and a compose section 288. The header 284 includes the username 290 of the other user(s) involved in the conversation, a "refresh" button 292, and a "back" button 294 in the form of a left-facing arrow (by way of example). The view section 286 presents the messages 296 arranged in chronological order with the most recent message 296 on the bottom. The view section 286 also includes a thumbnail image 298 of the other user's profile picture positioned on the left side of the screen next to each message 296 that the other user sent, and a thumbnail image 300 of the user's profile picture positioned on the right side of the screen next to each message 296 that the user sent. Tapping on the thumbnail image 298 prompts the computer to direct the user to the other user's profile page 408 (e.g. FIG. 30). Tapping on the thumbnail image 300 prompts the computer to direct the user to the user's own profile page 364 (e.g. FIG. 27). The compose section 288 includes a text form field 302, an attachment icon 304 (e.g. in the form of a paper clip), a virtual keyboard 306, and a "send" button 308. The user to input the message that they wish to send through interaction with the virtual keyboard 306. As the user is "typing" on the virtual keyboard 306, the computer causes the message to appear in the text form field 302. The user may attach a picture or other file using the attachment icon 304. The user then taps the "Send" button 308 once, which in turn causes the computer to post the message to the view section 286.

A "New Conversation" button 310 positioned by way of example at the bottom of the Messages GUI screen 270 (FIG. 18) prompts the computer to direct the user to a new conversation screen (not shown), where the user may search for and select one or more users to start a conversation with. Once the other user(s) is selected, the user may input a message into a message form field using a virtual keyboard, and send that message to the other user through the network.

The application of the present disclosure advantageously enables independent access to major streaming music library accounts and improved sharing between different major streaming music libraries. More specifically, the BLKBOX application allows users to share music with other users who have a different streaming music provider, which has been heretofore not possible. This feature of the BLKBOX application allows each user to enjoy full song playback and other features provided by each major streaming music library. Each user has the ability to sign into a major streaming music library account with which they have established. In the case of a "premium"/"paid" service, the user will have access to their account and music database via terms and conditions of said provider. For example, they can choose to stream full length songs or pair moments of their life with the ability to choose start and stop locations of the song when paired to the user media content as well as have access to account information sourced from the major streaming music library account and use it within the BLKBOX application. When signed into a major streaming music library, the BLKBOX application will then search for and source content from the associated major streaming music library using its public API. Each user then has the ability to stream related songs shared within BLKBOX from their own account verses streaming from the suggested API source of the BLKBOX application. In this manner, by way of example only, if User A selects a song to share from iTunes (e.g. U2s— "With or Without You") via the "messenger" functionality of the BLKBOX application, User B (who is signed into his/her Spotify premium account) will source their playback of the U2 song "With or Without You" from their own account on Spotify and not through the itunes API from User A. Further, when users are signed into their own major streaming music library accounts, the BLKBOX application will cross reference each track shared by other users to find the selected song on their preferred major streaming music library using catalog identifiers like ISRC codes and other identifiers unique to each service. In the case where a user does not have an account with a major streaming music library, the BLKBOX application will source music from an API selected by the BLKBOX application or, alternatively, an API source selected by the user in the Settings or Preferences functionality within the BLKBOX application.

Figure 20:
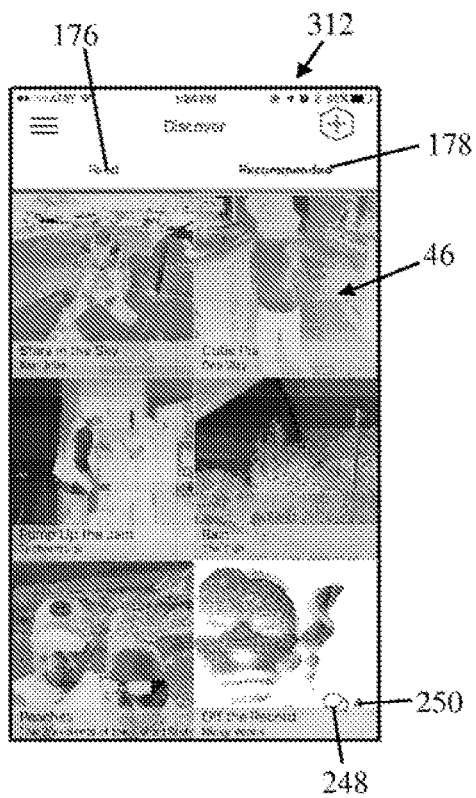
FIG. 20 is an example "Recommended Feed" GUI screen forming part of the music-based social networking application of FIG. 1.

FIG. 20 illustrates an example of a "Recommended" Feed GUI screen 312, which a user may navigate to by pressing the aforementioned "Recommended" toggle button 178 to prompt the computer to switch the user from their own feed 20 to the "recommended" feed 46. The "recommended" feed 46 is an algorithmically calculated list of "recommended" music/posts based on the usage/behavior of the user. By way of example only, the "recommended" feed 46 is initially presented in a scrollable thumbnail view, with fifty thumbnails (for example) being presented at any one time. If the user finds a thumbnail view that they are interested in, the user taps on the thumbnail which prompts the computer to direct the user to the scrollable post view screen for the "recommended feed" 46, which is identical in every way to the scrollable post window 168 described above in regard to the Feed Homepage 162.

The BLKBOX application and underlying algorithms have great promise and functionality for advertising. In particular, algorithms within the BLKBOX application may be used to generate music for ads that are based on the music-listening preferences of the particular user, which are gathered and curated via the BLKBOX application during the setup process (e.g. if the user selects a particular genre of music or artist as being one of their favorites) and/or over time based on the various music selections of the user while using the BLKBOX application. In either case, the BLKBOX application can interface with any digital advertising that is presented to the user in order to stream the user-preferred music content with such digital advertising presented to the user. Digital advertising may be presented in any number of suitable manners or avenues, including but not limited to within the BLKBOX application (e.g. within the user's home feed 20 and/or the "recommended" feed 46), within other applications (e.g. Facebook, Instagram, Snapchat, etc. . . . ) and/or any streaming media content source or provider (e.g. Netflix, Hulu, Amazon Prime, cable providers, etc. . . . ). In this manner, the user will be more likely to stop and/or pay attention to the digital advertising based on the fact they are presented with music they prefer or resonate with as part of the digital advertising. This may be particularly advantageous and effective if the digital advertising is a single post within a large number of posts, such as may be the case on an Instagram feed, Facebook feed, etc. . . . . In any event, the BLKBOX application accomplishes this through the use of at least two URLs, one URL for the music content and one URL for the media content of the digital advertising.

Figure 21:
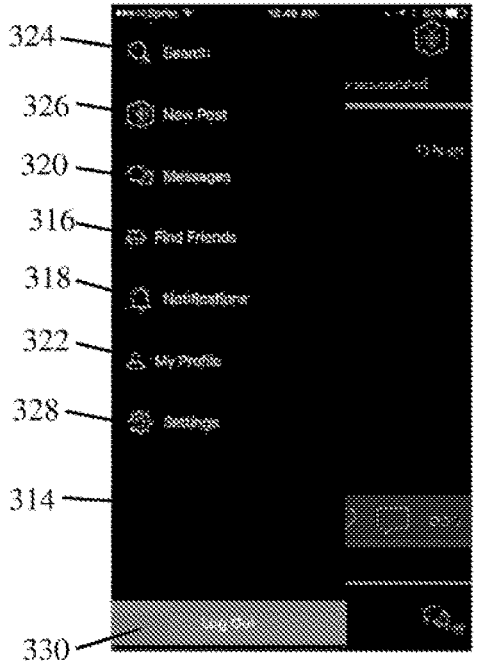
FIG. 21 is an example menu GUI screen forming part of the music-based social networking application of FIG. 1.

FIG. 21 illustrates an example of the main menu Tapping the "menu" icon 174 prompts the computer to present the user with the main menu 314 screen (e.g. sliding from the left of the screen). The main menu 314 screen presents the user with several navigation options including Find Friends 316, Notifications 318, Messages 320, My Profile 322, Search 324, New Post 326, Settings 328, and Logout 330. To return to the Feed Homepage 162, the user simply taps to the right of the main menu screen 314, which prompts the computer to hide the main menu screen 314 and present the Feed Homepage 162.

Figure 22:
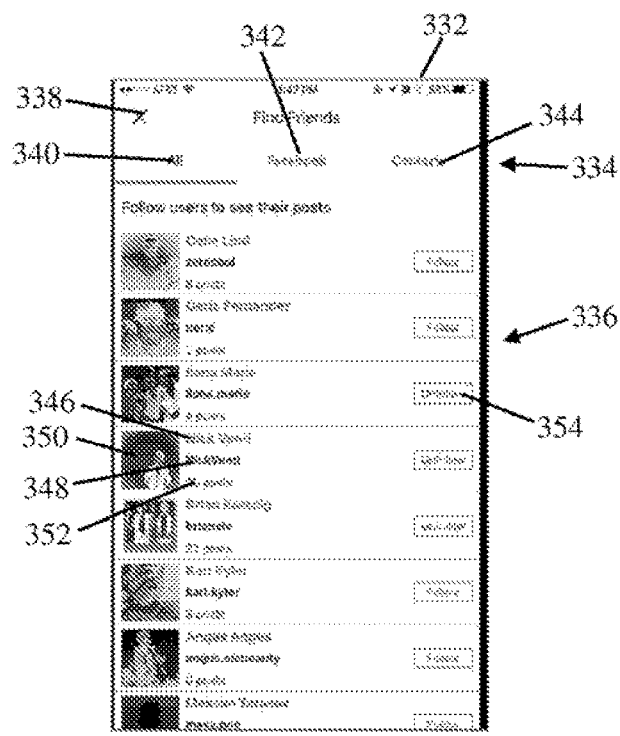
FIGS. 22-26 are example GUI screens relating to finding and following friends in the application, forming part of the music-based social networking application of FIG. 1.
Figure 23:
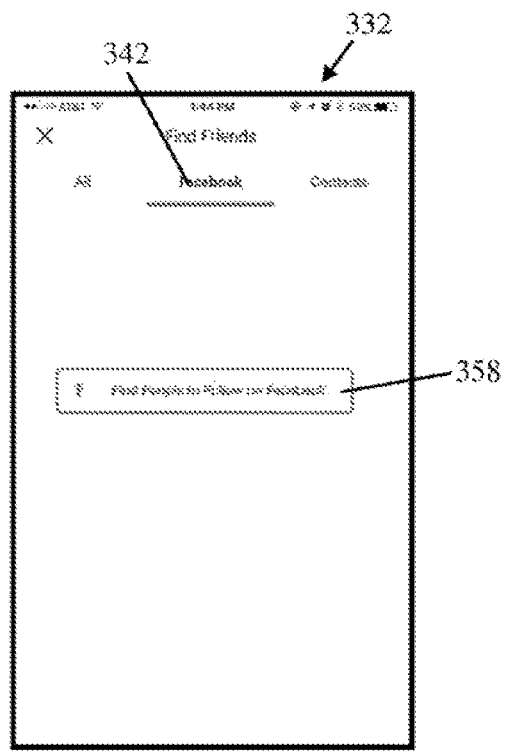
Figure 24:
Figure 25:
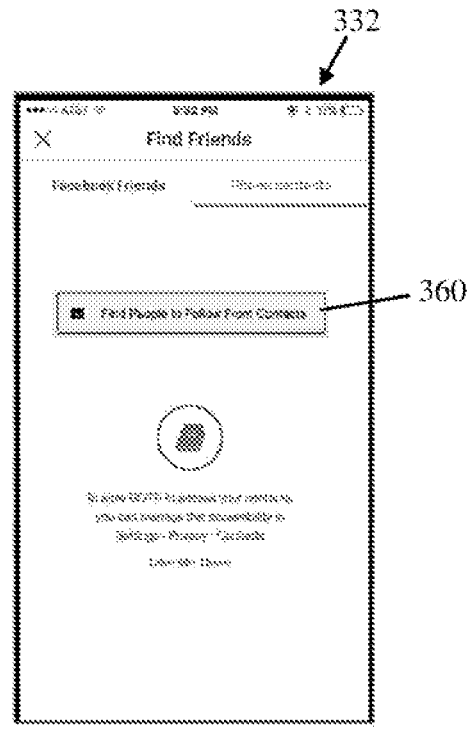
Figure 26:
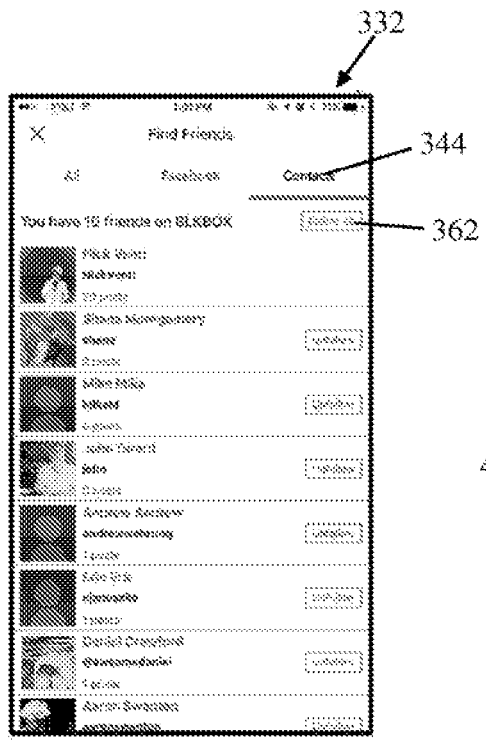

FIGS. 22-26 illustrate an example of the "Find Friends" GUI screen 332 that the computer directs the user to when the user taps on the Find Friends 316 option in the main menu 314. FIG. 22 is an exemplary initial Find Friends GUI screen 332. The initial presentation of the Find Friends GUI screen 332 includes a header 334 and a body section 336. The header 334 is positioned at the top of the screen and includes the screen title and an "X" icon 338 (or alternatively an left-facing arrow icon), an "All" tab 340, a "Facebook" tab 342, and a "Contacts" tab 344. Tapping the "X" icon 338 once prompts the computer to direct the user to the previous screen (e.g. the Feed Homepage 162). The "All" tab 340, "Facebook" tab 342, and "Contacts" tab 344 represent the three different ways that a user can find friends to add to their network. When the "All" tab 340 is selected (for example in by default), the tab is illuminated (e.g. in blue) and the body section 336 displays a scrollable list of all BLKBOX users. Each entry in the scrollable list of all users includes the user's real name 346, username 348, thumbnail image of the user's profile picture 350, number of posts made 352, and a "Follow/Unfollow" button 354. Tapping on the thumbnail image 350 prompts the computer to direct the user to the other user's profile page 408 (e.g. FIG. 30). In the event that the user is not following another user in the scrollable list, the "Follow/Unfollow" button 354 will appear as "Follow". Tapping on the "Follow" button 354 causes the computer to add the user to the other user's Followers list 390 (FIG. 29) and simultaneously add the other user to the user's Following list (not shown). In the event that the user is already following another user in the scrollable list, the "Follow/Unfollow" button 354 will appear as "Unfollow". Tapping on the "Unfollow" button 354 causes the computer to remove the other user from the user's Following list (not shown) and simultaneously remove the user from the other user's Followers list 390 (FIG. 29).

When the "Facebook" tab 342 is selected, the tab is illuminated (e.g. in blue) and if the user is not already connected to Facebook (e.g. not signed in through Facebook or not yet a Facebook user), then the computer will display a radio button 356 in the body section 336 (FIG. 21) that when tapped prompts the computer to direct the user to the Facebook login screen 108 described above in relation to FIG. 8. After the user logs in to (or signs up for) Facebook (not required), the body section 336 displays a scrollable list of Facebook friends who are also BLKBOX users. Each entry in the scrollable list of Facebook/BLKBOX friends includes the same information/functionality as the scrollable list of All users described above. Additionally, the body section 336 under the Facebook tab 342 includes a "Follow All" button 358 that, when tapped by the user, prompts the computer to add all Facebook friends that are also BLKBOX users to the user's "Following" list (and consequently add the user to each of the Facebook friends' followers lists). Alternatively, the Facebook tab 342 show a list of all Facebook friends regardless of whether they are also users of the BLKBOX application software, and include an option to invite Facebook friends to BLKBOX.

When the "Contacts" tab 344 is selected, the tab is illuminated (e.g. in blue) and if the user has not already given the app permission to access the contacts list on the communications device, then the computer will display a radio button 360 in the body section 336 (FIG. 25) that when tapped prompts the computer to request the user to grant permission for BLKBOX to access the device's Contacts list. After the user grants the necessary permission, the body section 336 displays a scrollable list of Contacts who are also BLKBOX users. Each entry in the scrollable list of Contacts/BLKBOX users includes the same information/functionality as the scrollable list of All users described above. Additionally, the body section 336 under the Contacts tab 344 includes a "Follow All" button 360 that, when tapped by the user, prompts the computer to add all Contacts that are also BLKBOX users to the user's "Following" list (and consequently add the user to each of the Contacts friends' followers lists). Additionally, the Contacts tab 344 may show a list of all Contacts regardless of whether they are also users of the BLKBOX application software, and include an option to invite Contacts to BLKBOX. If selected, this option may send a text and/or email to each contact inviting them to join BLKBOX.

Referring again to FIG. 21, tapping the Notifications option 318 on the main menu 314 prompts the computer to present the Notifications GUI screen 252 (FIG. 17) to the user, as an alternative to tapping on the Notifications icon 248 on the Feed Homepage 162 as previously described. Similarly, tapping the Messages option 320 on the main menu 314 prompts the computer to present the Messages GUI screen 270 (FIG. 18) to the user, as an alternative to tapping on the Messages tab 256 on the Notifications GUI screen 252 as previously described.

Figure 27:
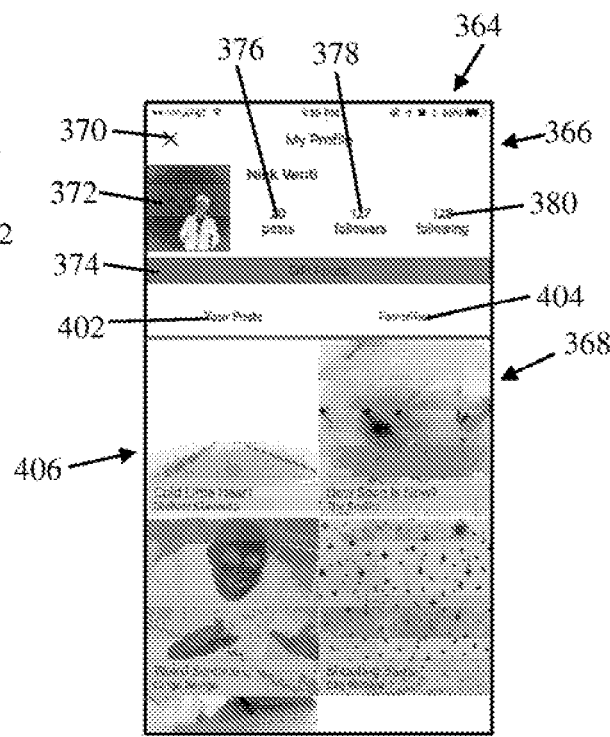

Tapping on the My Profile option 322 on the main menu 314 prompts the computer to direct the user to the My Profile GUI screen 364 shown by way of example in FIGS. 27-28. The My Profile GUI screen 364 by way of example includes a header section 366 and a body section 368. The header 366 is positioned at the top of the screen and includes the screen title and a "X" icon 370 (or alternatively an left-facing arrow icon). Tapping the "X" icon 370 once prompts the computer to direct the user to the previous screen (e.g. Feed Homepage 162). The header section 366 also includes a thumbnail image 372 of the user's profile picture, an "Edit Photo" button 374, and a plurality of profile analytics, which display the number of posts 376 the user has made, the number of followers 378 the user has, and the number of other users that the user is following 380. Tapping on the "Edit Photo" button 374 prompts the computer to present a screen in which the user can choose a new photo from the device's camera roll, for example. Tapping on the followers 378 indicator prompts the computer to direct the user to the Followers GUI screen 382, shown by way of example in FIG. 29. Tapping on the following 380 indicator prompts the computer to direct the user to the Following GUI screen (not shown), which is virtually identical to the Followers GUI screen 382 described above with the exception being that the list of users presented in the Following GUI screen are the other users that the user is following.

The Followers GUI screen 382 displays a list of the other users that are following the user. The Followers GUI screen 382 by way of example includes a header section 384 and a body section 386. The header 384 is positioned at the top of the screen and includes the screen title and a "X" icon 388 (or alternatively an left-facing arrow icon). Tapping the "X" icon 388 once prompts the computer to direct the user to the previous screen (e.g. My Profile 364). The body section 386 includes a Followers list 390. Each entry in the scrollable list of followers 390 includes the user's real name 392, username 394, thumbnail image of the user's profile picture 396, number of posts made 398, and an "Unfollow" button 400. Tapping on the thumbnail image 396 prompts the computer to direct the user to the other user's profile page 408 (e.g. FIG. 30). Tapping the "Unfollow" button 400 removes the user associated with the "unfollow" button from the user's follower list.

Referring again to FIG. 28, the body section 368 includes a "Your Posts" tab 402, a "Favorites" tab 404, and a thumbnail display 406 positioned under the tabs 402, 404. When the "Your Posts" tab 402 is highlighted (default setting), the thumbnail display 406 displays thumbnail images related to the user's posts, in chronological order with the most recent in the top left spot. Tapping on the "Favorites" tab 404 prompts the computer to switch the thumbnail display 406 from the user's "Favorites" (e.g. posts of others that the user has "Liked"). When the user taps on the thumbnail in either tab, the computer is prompted to display the posts (either the user's posts or the user's favorites) in a scrollable post view screen ("feed") that is identical in every way to the scrollable post window 168 described above in regard to the Feed Homepage 162.

FIG. 30 is an example of a user profile GUI screen 408 as it appears to a visiting user according to an aspect of the disclosure. The user profile GUI screen 408 by way of example includes a header 410 and a body section 412. The header 410 is positioned at the top of the screen and includes the screen title (e.g. the username of the user whose profile is being visited) and an "X" icon 414 (or alternatively an left-facing arrow icon). Tapping the "X" icon 414 once prompts the computer to direct the user to the previous screen (e.g. Feed Homepage 162, Followers screen 382, etc.). The header 410 also includes a thumbnail image 416 of the user's profile picture, a "Follow/Unfollow" button 418, and a plurality of profile analytics, which display the number of posts 420 the user has made, the number of followers 422 the user has, and the number of other users that the user is following 424. If the visiting user is already following the user, then computer will present the "Follow/ Unfollow" button 418 as "Unfollow," and tapping on the "Unfollow" button 418 prompts the computer to remove the user from the visiting user's Following list (and remove the visiting user from the user's Followers list). If the visiting user is not already following the user, then computer will present the "Follow/Unfollow" button 418 as "Follow," and tapping on the "Follow" button 418 prompts the computer to add the user to the visiting user's Following list (and add the visiting user to the user's Followers list). Tapping on the followers 422 indicator prompts the computer to direct the visiting user to the user's Followers GUI screen 382, shown by way of example in FIG. 29. Tapping on the following 424 indicator prompts the computer to direct the visiting user to the Following GUI screen (not shown), which is virtually identical to the Followers GUI screen 382 described above with the exception being that the list of users presented in the Following GUI screen are the other users that the user is following. It should be noted that, when a visiting user is directed to a user's Followers GUI screen 382 or Following GUI screen, the computer presents the "follow/unfollow" buttons 400 (e.g. FIG. 29) as they relate to the visiting user.

The body section 412 displays thumbnail images related to the user's posts, in chronological order with the most recent in the top left spot. When the visiting user taps on the thumbnail, the computer is prompted to display the user's posts in a scrollable post view screen ("feed") that is identical in every way to the scrollable post window 168 described above in regard to the Feed Homepage 162.

Tapping the Search option 324 on the main menu 314 (FIG. 21) prompts the computer to direct the user to the initial Search GUI screen 426 (FIG. 31). By way of example, the search GUI screen 426 includes a header 428, menu bar 430, and body section 432. The header 428 includes an "X" icon 434 that when tapped once prompts the computer to direct the user to the previous screen (e.g. Feed Homepage 162) and a text form field 436. Tapping on the text form field 436 causes the communications device to present a popup virtual keyboard (not shown), enabling the user to input search terms through interaction with the virtual keyboard. The menu bar 430 includes four tabs that correspond to the searchable items within the app, including music 438, posts 440, tags 442, and users 444. The default search page is for music, and so the music tab 438 is illuminated and underlined in a blue color (for example) to give visual feedback to the user. Found (or suggested) music is displayed in the body section 432. For example, when a user first navigates to the music search page, the body section 432 is populated with recommended songs and/or artists. When the user begins to enter a search query within the text form field 436, the computer causes the recommended songs and artists to disappear, and the list is replaced by search results. Each song listing includes the name of the artist 446, song title 448, an album art thumbnail picture 450, and a "Start a Post" button 452. Tapping once on the thumbnail picture 450 causes the computer to initiate a stream of the song. Tapping a second time on the thumbnail picture 450 causes the computer to stop the stream of the song. Tapping on the "Start a Post" button 452 in a specific song listing prompts the computer to direct the user to the New Post screen 464, with the selected song already chosen (e.g. FIG. 37).

Tapping on the posts tab 440 prompts the computer to switch the body section 432 to present posts for searching, as illustrated by way of example in FIG. 32. The header 428 and menu bar 430 remain unchanged, save for in this instance the posts tab 440 is now illuminated and underlined in a blue color (for example). The body 432 now displays post thumbnails, which initially are of the "recommended" variety. The user can enter search terms in the text form field 436 (through interaction with a virtual keyboard) to search for songs that were used in posts, and as the user searches, the computer populates the body section 432 with posts that satisfy the search query. As with similar areas previously discussed that involve a presentation of posts as a thumbnail display, tapping on one of the thumbnail opens the post in a scrollable "feed" view, with all of the associated form and functionality (e.g. as with the Feed Homepage 162 described above).

Tapping on the tags tab 442 prompts the computer to switch the body section 432 to present tags (e.g. hashtags) for searching, as illustrated by way of example in FIG. 33. The header 428 and menu bar 430 remain unchanged, save for in this instance the tags tab 442 is now illuminated and underlined in a blue color (for example). The body 432 now displays post thumbnails of posts that have tags associated with them, for example in the post description or comments sections, which initially are of the "recommended" variety. The user can enter search terms in the text form field 436 (through interaction with a virtual keyboard) to search for tags that were used in posts, and as the user searches, the computer populates the body section 432 with posts that satisfy the search query.

Tapping on the users tab 444 prompts the computer to switch the body section 432 to present users for searching, as illustrated by way of example in FIG. 34. The header 428 and menu bar 430 remain unchanged, save for in this instance the users tab 444 is now illuminated and underlined in a blue color (for example). The body 432 now displays a scrollable list of recommended users (e.g. initially). Each entry in the scrollable list of recommended users includes the user's real name 454, username 456, thumbnail image of the user's profile picture 458, number of posts made 460, and a "Follow/Unfollow" button 462. Tapping on the thumbnail image 458 prompts the computer to direct the user to the other user's profile page 408 (e.g. FIG. 30). In the event that the user is not following another user in the scrollable list, the "Follow/Unfollow" button 462 will appear as "Follow". Tapping on the "Follow" button 462 causes the computer to add the user to the other user's Followers list 390 (FIG. 29) and simultaneously add the other user to the user's Following list (not shown). In the event that the user is already following another user in the scrollable list, the "Follow/ Unfollow" button 462 will appear as "Unfollow". Tapping on the "Unfollow" button 462 causes the computer to remove the other user from the user's Following list (not shown) and simultaneously remove the user from the other user's Followers list 390 (FIG. 29).

FIGS. 35-41 illustrate various GUIs related to creating paired content posts according to an aspect of the disclosure. By way of example, FIG. 35 is an example of an initial New Post GUI screen 464, that is accessible either by tapping on the "Post" icon 172 (e.g. on Feed Homepage 162) or by tapping on the New Post option 326 in the main menu 314 (FIG. 21). In either case, the computer is prompted to direct the user to the New Post GUI screen 464. By way of example, the New Post GUI screen 464 includes a header 466, visual media selection display 468, "add song" bar 470, visual media library display 472, and bottom bar 474. The header 466 includes a page title 476 (e.g. "New Post"), an "X" icon 478, and a "Next" button 480. Tapping the "X" icon 338 once prompts the computer to direct the user to the previous screen (e.g. the Feed Homepage 162). The visual media selection display 468 shows the chosen visual media content (e.g. picture or video selected from the user device's camera roll, GIF from user's device or external source such as the internet). Tapping on the visual media selection display 468 prompts the computer to play the song (if chosen) and video (if a video is the selected visual media content). By default, the visual media selection display 468 shows the most recent photo or video in the user's device library. This can be changed as follows. The visual media library display 472 comprises a scrollable (left-right) display of the user device's media library, arranged in chronological order with the newest on the far left. When the user finds a photo or video that they want to share in the post, the user may tap once on the photo/video in the visual media library display 472, prompting the computer to display the chosen visual media in the visual media selection display 468. The bottom bar 474 includes options including Library 482, Photo 484, and Video 486. The Library 482 option (chosen by default) prompts the computer to display all visual media (photos and videos) in the user device's media library within the visual media library display 472. Tapping the Photo 484 option prompts the computer to display only the user's photos in the visual media library display 472. Tapping on the Video 486 option prompts the computer to display only the user's videos in the visual media library display 472. A camera roll icon 485 is positioned by way of example only in the bottom-left corner of the screen. Tapping on the camera roll icon 485 prompts the computer to direct the user to the Camera Roll GUI screen 518, shown by way of example in FIG. 39.

Figure 36:
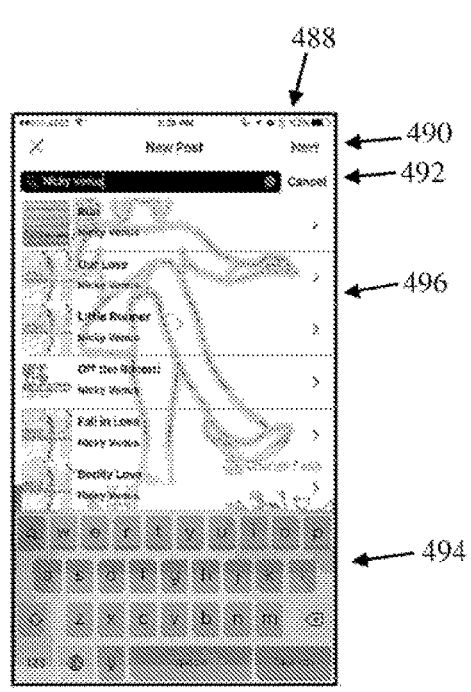
Figure 37:
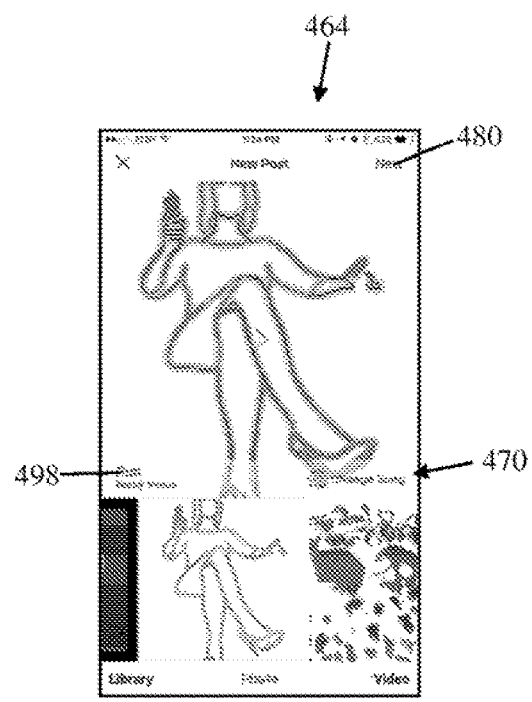
Figure 38:
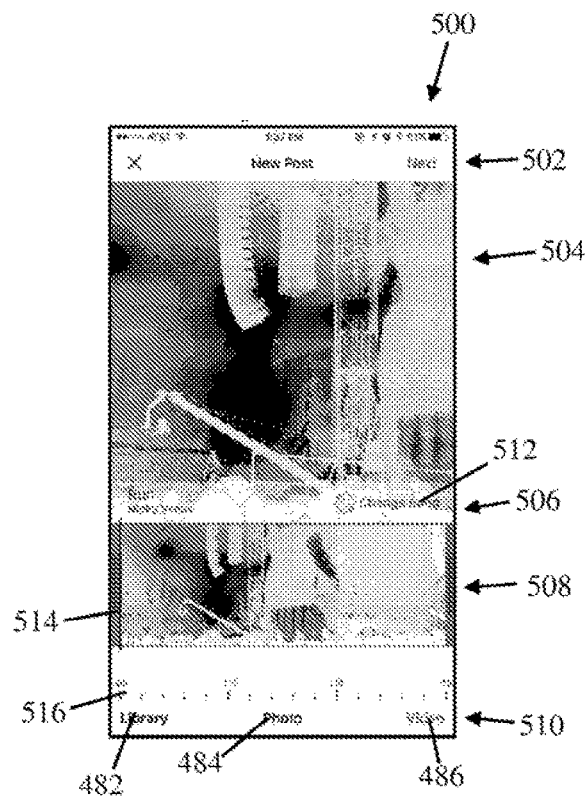

To add a song, the user taps on the "Add Song" bar 470, which prompts the computer to display the Add Song GUI 488, shown by way of example in FIG. 36. The illustrated example of the Add Song GUI 488 includes a header 490, search bar 492, virtual keyboard 494, and a song display 496. The header 490 is the same as header 466 above. The virtual keyboard 494 enables the user to input search terms into the search bar 492 through interaction with the virtual keyboard. The computer searches for the song in one or more external streaming music providers (e.g. Spotify, Apple Music, Soundcloud, YouTube, etc.) and displays the results as a list in the song display 496 section. The user selects a song from the song display by tapping on it, which prompts the computer to associate the chosen song with the chosen visual media and direct the user to back to the initial New Post GUI 464, which now has the chosen song 498 indicated by title and artist in the "Song" bar 470 (which now gives the option to "Change Song" instead of "Add Song")(see e.g. FIG. 37). Tapping on the "Change Song" option reopens the "Add Song" GUI 488 so the user can change the song choice.

Tapping the "Next" button 480 prompts the computer to direct the user to the next GUI screen in the workflow, which at this point (e.g. if a video is selected and a song is chosen) is the Video Edit GUI 500. By way of example, the Video Edit GUI 500 includes a header 502, display 504, song bar 506, edit video section 508, and a bottom bar 510. The header 502 is the same as header 466 above. The display 504 presents the visual media. Tapping once on the display 504 prompts the computer to preview the post, that is, begin playing the music and video (if there is a video). Tapping a second time prompts the computer to stop playing the music and/or video. The song bar 506 displays the chosen song and includes a "Change Song" button 512 which, if tapped by the user, prompts the computer to direct the user to the "Add Song" GUI 488 described above, where the user may change songs if desired. The Edit Video section 508 includes an edit bar 514 and a seconds "measuring tape" 516. The user can adjust the scroll to select a specific 15-second clip of their video to use in the post. Moving the edit bar 514 will change the start and stop times of the video clip. The bottom bar includes the Library option 482, Photo option 484, and video option 486 discussed above. Tapping on any one of these options causes the computer to redirect the user to the initial "New Post" GUI screen 464 with the selected option enabled. For example, tapping the Library option 482 takes the user back to the "New Post" GUI screen 464 and prompts the computer to display all visual media (photos and videos) in the user device's media library within the visual media library display 472. Tapping the Photos option 484 takes the user back to the "New Post" GUI screen 464 and prompts the computer to display only the photos in the user device's media library within the visual media library display 472. Tapping the Video option 486 takes the user back to the "New Post" GUI screen 464 and prompts the computer to display only the videos in the user device's media library within the visual media library display 472. The flow would then proceed from that point as previously described.

Figure 39:
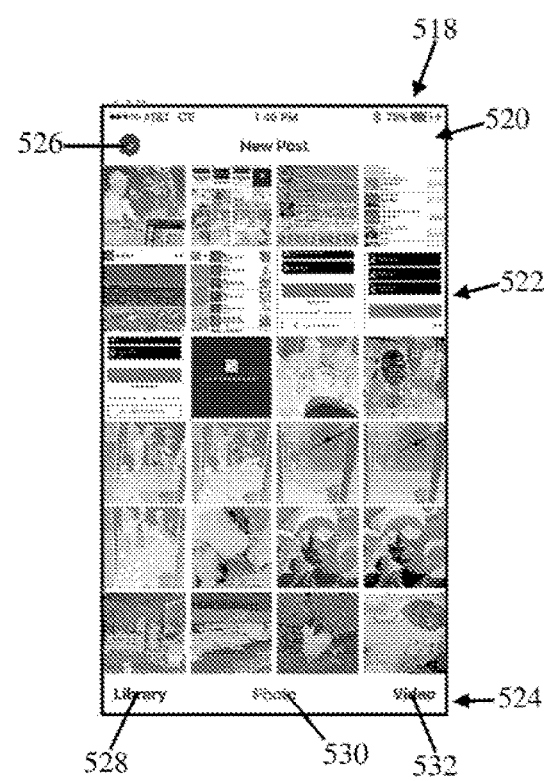

FIG. 39 illustrates an example of the Camera Roll GUI screen 518, which is accessed by pressing the camera roll icon 485 (for example) as previously described. The Camera Roll GUI screen 518 integrates with the native camera roll (e.g. on iOS) to provide the user with a more efficient way to search through potentially thousands of photos and videos. By way of example, the Camera Roll GUI screen 518 includes a header bar 520, camera roll display 522, and a camera roll menu 524. The header bar 520 includes a minimize button 526 that when tapped, prompts the computer to minimize the Camera Roll GUI screen 518 without making a selection, returning the user to the position they were in before activating the camera roll GUI screen 518. The camera roll display 522 includes a plurality of thumbnail images of the media in a user's camera roll. Tapping on any one of the thumbnails selects that media for the post. The camera roll menu 524 includes a Library option 528 (shown by default) a Photos option 530, and a Video option 532. The Library 528 option (chosen by default) prompts the computer to display all visual media (photos and videos) in the user device's camera roll within the camera roll display 522. Tapping the Photo 530 option prompts the computer to display only the user's photos in the camera roll display 522. Tapping on the Video 532 option prompts the computer to display only the user's videos in the camera roll display 522.

Figure 40:
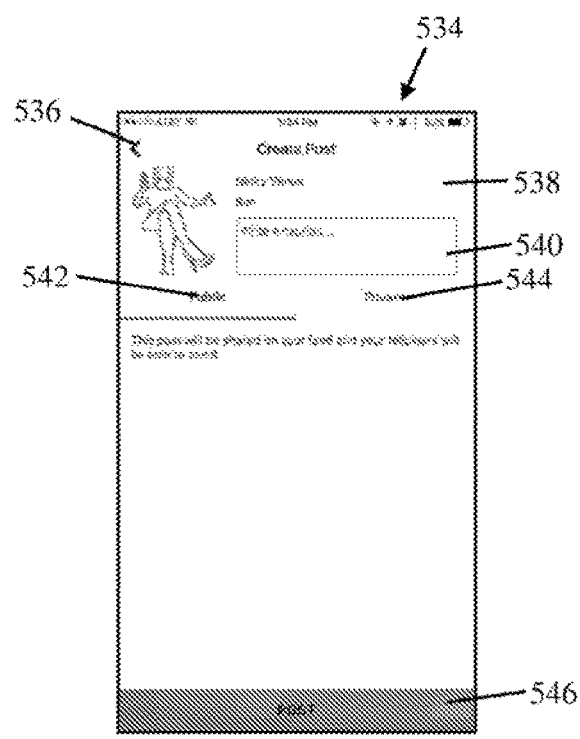
Figure 41:
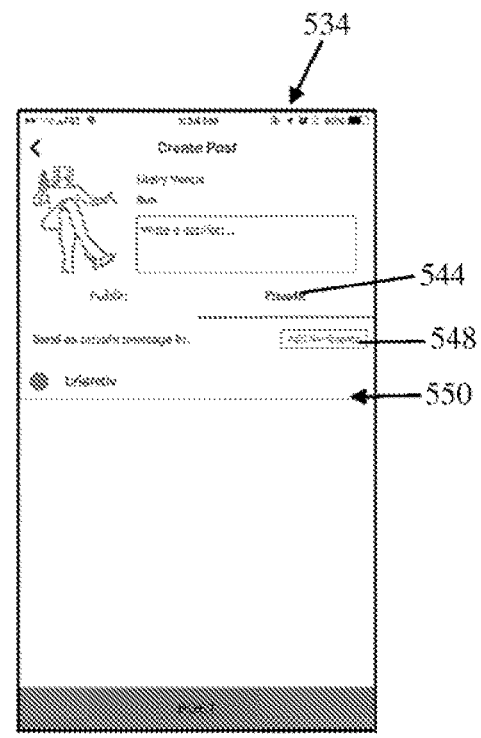

Once the user is satisfied with the visual media selection and the song selection, the user taps on an appropriate button (e.g. "Next" button 480), and the computer advances the user to the Create Post GUI screen 534, shown by way of example in FIGS. 40-41. The Create Post GUI screen 534 includes a "back" button 536, post information box 538, caption box 540, a "Public" tab 542, a "Private" tab 544, and a "Post" button 546. By way of example, the "back" button 536 is represented by a left-facing arrow, and tapping on the "back" button 536 prompts the computer to direct the user to the previous screen. The post information box 538 may include the song title and artist. The caption box 540 is a fillable field that enables the posting user to insert a caption with the post. The public tab 542 (selected by default) when selected ensures that the post will be posted publically, that is on the user's feed so that anyone can search for it and so that the user's followers can see it immediately. The private tab 544, when selected enables the user to select a specific person or group of people to view the post. Shown by way of example in FIG. 41, the private tab 544 includes an "Add recipients" button 548 and a recipients list 550. The "Add recipients" button 548 allows the user to search for and add recipients to the recipient list 550. Once the desired recipient list has been assembled, the user taps the "Post" button 546 and the post is sent to the named recipients only.

Figure 42:
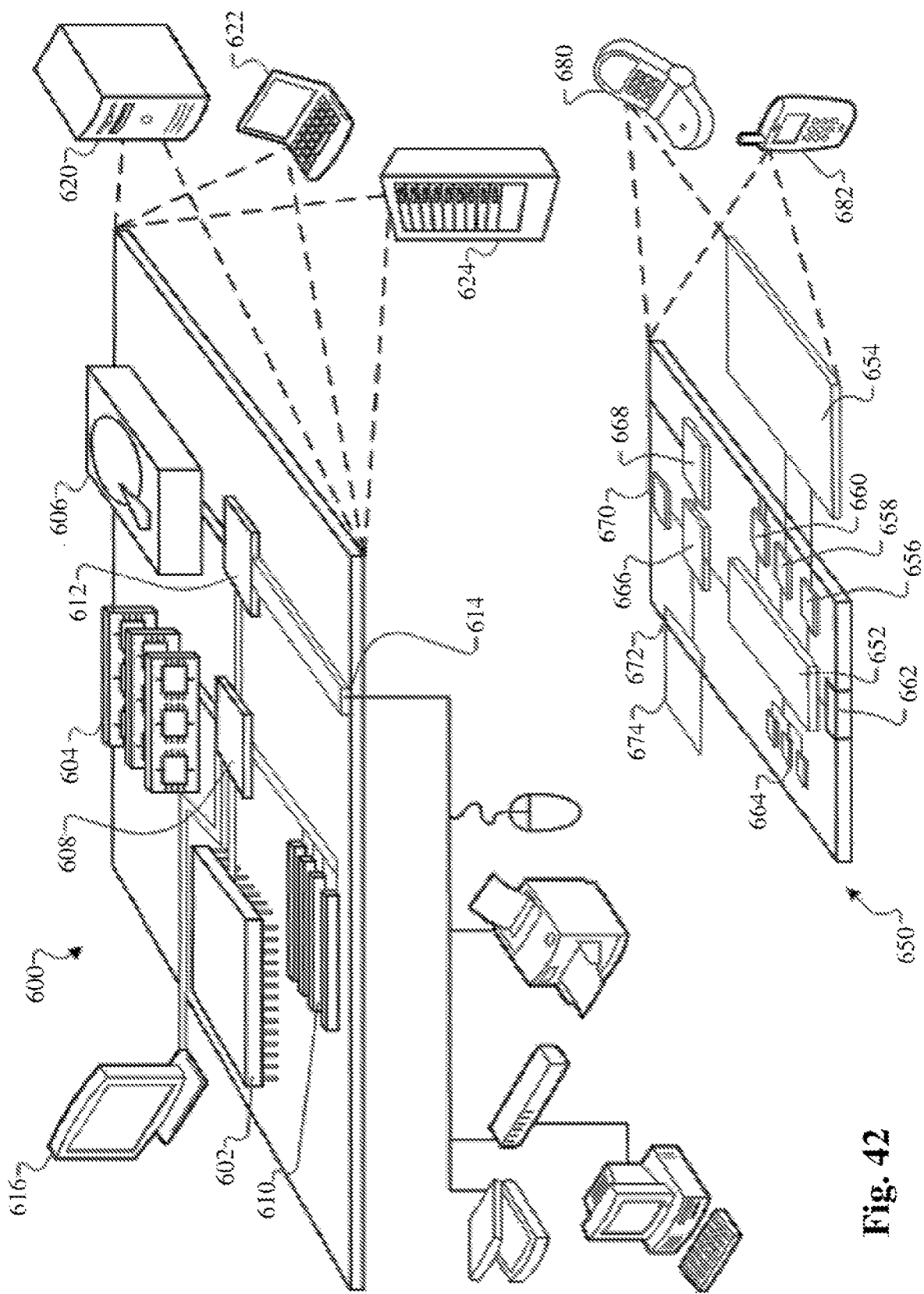
FIG. 42 is a block diagram of computer systems forming part of the music-based social networking application of FIG. 1.

FIG. 42 is a block diagram of computing devices 600, 650 that may be used to implement the systems and methods described in this document, as either a client or as a server or plurality of servers. Computing device 600 is intended to represent various forms of digital computers, such as laptops, desktops, workstations, personal digital assistants, servers, blade servers, mainframes, and other appropriate computers. Computing device 650 is intended to represent various forms of mobile devices, such as personal digital assistants, cellular telephones, smartphones, and other similar computing devices. In this example, computing device 650 may represent communications device 56 (e.g. smartphone, tablet computer, laptop computer, desktop computer, virtual reality (VR) device, augmented reality (AR) device, and personal data assistant, etc.), while computing device 600 may represent computing systems that serve as the "cloud" referenced in this disclosure. The components shown here, their connections and relationships, and their functions, are meant to be examples only, and are not meant to limit implementations described and/or claimed in this document.

Computing device 600 includes a processor 602, memory 604, a storage device 606, a high-speed interface 608 connecting to memory 604 and high-speed expansion ports 610, and a low speed interface 612 connecting to low speed bus 614 and storage device 606. Each of the components 602, 604, 606, 608, 610, and 612, are interconnected using various busses, and may be mounted on a common motherboard or in other manners as appropriate. The processor 602 can process instructions for execution within the computing device 600, including instructions stored in the memory 604 or on the storage device 606 to display graphical information for a GUI on an external input/output device, such as display 616 coupled to high-speed interface 608. In other implementations, multiple processors and/or multiple buses may be used, as appropriate, along with multiple memories and types of memory. Also, multiple computing devices 600 may be connected, with each device providing portions of the necessary operations (e.g., as a server bank, a group of blade servers, or a multi-processor system).

The memory 604 stores information within the computing device 600. In one implementation, the memory 604 is a volatile memory unit or units. In another implementation, the memory 604 is a non-volatile memory unit or units. The memory 604 may also be another form of computer-readable medium, such as a magnetic or optical disk.

The storage device 606 is capable of providing mass storage for the computing device 600. In one implementation, the storage device 606 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 604, the storage device 606, or memory on processor 602.

The high-speed controller 608 manages bandwidth-intensive operations for the computing device 600, while the low speed controller 612 manages lower bandwidth-intensive operations. Such allocation of functions is by way of example only. In one implementation, the high-speed controller 608 is coupled to memory 604, display 616 (e.g., through a graphics processor or accelerator), and to high-speed expansion ports 610, which may accept various expansion cards (not shown). In the implementation, low-speed controller 612 is coupled to storage device 606 and low-speed expansion port 614. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 620, or multiple times in a group of such servers. It may also be implemented as part of a rack server system 624. In addition, it may be implemented in a personal computer such as a laptop computer 622. Alternatively, components from computing device 600 may be combined with other components in a mobile device (not shown), such as device 650. Each of such devices may contain one or more of computing device 600, 650, and an entire system may be made up of multiple computing devices 600, 650 communicating with each other.

Computing device 650 includes a processor 652, memory 664, an input/output device such as a display 654, a communication interface 666, and a transceiver 668, among other components. The device 650 may also be provided with a storage device, such as a microdrive or other device, to provide additional storage. Each of the components 650, 652, 664, 654, 666, and 668, are interconnected using various buses, and several of the components may be mounted on a common motherboard or in other manners as appropriate.

The processor 652 can execute instructions within the computing device 650, including instructions stored in the memory 664. The processor may be implemented as a chipset of chips that include separate and multiple analog and digital processors. Additionally, the processor may be implemented using any of a number of architectures. For example, the processor 410 may be a CISC (Complex Instruction Set Computers) processor, a RISC (Reduced Instruction Set Computer) processor, or a MISC (Minimal Instruction Set Computer) processor. The processor may provide, for example, for coordination of the other components of the device 650, such as control of user interfaces, applications run by device 650, and wireless communication by device 650.

Processor 652 may communicate with a user through control interface 658 and display interface 656 coupled to a display 654. The display 654 may be, for example, a TFT (Thin-Film-Transistor Liquid Crystal Display) display or an OLED (Organic Light Emitting Diode) display, or other appropriate display technology. The display interface 656 may comprise appropriate circuitry for driving the display 654 to present graphical and other information to a user. The control interface 658 may receive commands from a user and convert them for submission to the processor 652. In addition, an external interface 662 may be provided in communication with processor 652, so as to enable near area communication of device 650 with other devices. External interface 662 may provide, for example, for wired communication in some implementations, or for wireless communication in other implementations, and multiple interfaces may also be used.

The memory 664 stores information within the computing device 650. The memory 664 can be implemented as one or more of a computer-readable medium or media, a volatile memory unit or units, or a non-volatile memory unit or units. Expansion memory 674 may also be provided and connected to device 650 through expansion interface 672, which may include, for example, a SIMM (Single In Line Memory Module) card interface. Such expansion memory 674 may provide extra storage space for device 650, or may also store applications or other information for device 650. Specifically, expansion memory 674 may include instructions to carry out or supplement the processes described above, and may include secure information also. Thus, for example, expansion memory 674 may be provided as a security module for device 650, and may be programmed with instructions that permit secure use of device 650. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, cause performance of one or more methods, such as those described above. The information carrier is a computer- or machine-readable medium, such as the memory 664, expansion memory 674, or memory on processor 652 that may be received, for example, over transceiver 668 or external interface 662.

Device 650 may communicate wirelessly through communication interface 666, which may include digital signal processing circuitry where necessary. Communication interface 666 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 668. In addition, short-range communication may occur, such as using a Bluetooth, WiFi, or other such transceiver (not shown). In addition, GPS (Global Positioning System) receiver module 670 may provide additional navigation- and location-related wireless data to device 650, which may be used as appropriate by applications running on device 650.

Device 650 may also communicate audibly using audio codec 660, which may receive spoken information from a user and convert it to usable digital information. Audio codec 660 may likewise generate audible sound for a user, such as through a speaker, e.g., in a handset of device 650. Such sound may include sound from voice telephone calls, may include recorded sound (e.g., voice messages, music files, etc.) and may also include sound generated by applications operating on device 650.

The computing device 650 may be implemented in a number of different forms, some of which are shown in the figure. For example, it may be implemented as a cellular telephone 680. It may also be implemented as part of a smartphone 682, personal digital assistant, or other similar mobile device.

Additionally computing device 600 or 650 can include Universal Serial Bus (USB) flash drives. The USB flash drives may store operating systems and other applications. The USB flash drives can include input/output components, such as a wireless transmitter or USB connector that may be inserted into a USB port of another computing device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, apparatus and/or device (e.g., magnetic discs, optical disks, memory, Programmable Logic Devices (PLDs)) used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), peer-to-peer networks (having ad-hoc or static members), grid computing infrastructures, and the Internet.

The computing system can include clients and servers. A client and server are generally remote from each other and typically interact through a communication network. The relationship of client and server arises by virtue of computer programs running on the respective computers and having a client-server relationship to each other.

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

Any of the features or attributes of the above the above described embodiments and variations can be used in combination with any of the other features and attributes of the above described embodiments and variations as desired. Various modifications, additions and other alternative embodiments are possible without departing from the true scope and spirit. The embodiments presented herein were chosen and described to provide an illustration of various principles of the present invention and its practical application to thereby enable one of ordinary skill in the art to utilize the invention in various embodiments and with various modifications as are suited to the particular use contemplated. All such modifications and variations are within the scope of the present invention as determined by the appended claims when interpreted in accordance with the benefit to which they are fairly, legally, and equitably entitled.

What is claimed is:

1. An application for use on a communications device for creating and sharing a music-based social media post comprising digital visual media content paired with digital music content between at least two users each having a communications device with computer-readable media, the application including computer executable instructions that, when executed by one or more processors, are configured to cause a computer system to perform the steps of:
   initiate, using a graphic user interface on a communications device of a first user, uploading, by the first user, live-streamed digital visual media content to a host server in digital communication with the communications device of the first user, wherein the live-streamed digital visual media content is assigned a first uniform resource locator (URL) stored in the host server;
   initiate, using the graphic user interface on the communications device of the first user, a selection by the first user of at least one digital music content file to be streamed from an external audio content provider in digital communication with the host server or uploaded to the host server from the communications device of the first user, wherein the selected digital music content file has a second URL stored in the host server, and wherein the second URL is separate from the first URL;
   initiate, using the graphic user interface on the communications device of the first user, a request by the first user received by the host server to pair at least a portion of the live-streamed digital visual media content with at least a portion of the selected digital music content file, whereby digital visual media content of the live-streamed digital visual media content and digital music content of the selected digital music content file are configured to be presented in parallel while remaining separate and without creation of a single combined file;
   share, upon a request by the first user received by the host server, the paired digital content with at least one additional user on a communications device of the at least one additional user; and
   play, on the communications device of the at least one additional user, and upon a request received by the host server, the paired live-streamed digital visual media content and the selected digital music content file by executing the first URL and the second URL simultaneously,
   wherein the digital music content selections or music-listening preferences of a particular user are compiled into a user music preference profile that is used to pair digital music content based on the compiled user music preference profile along with digital advertising presented to the user through a digital media source.

2. The application of claim 1, wherein the live-streamed digital visual media content further comprises a live-streaming video feed played in real time or near real time with an actual performance of the visual media content.

3. The application of claim 2, wherein the content file-related data contained within the meta data is displayed on the communications device of the at least one additional user simultaneously upon execution of the first URL and the second URL.

4. The application of claim 2, wherein the content file-related data contained within the meta data further comprises at least one of: a song title, an artist name, an album title, and live-video stream information.

5. The application of claim 1, further comprising meta data associated with at least one of the live-streamed digital visual media content or the selected digital music content file, wherein the content file-related data contained within the meta data is displayed to the at least one additional user.

6. The application of claim 1, wherein the at least one additional user: starts the streaming of the paired digital content; stops the streaming of the paired digital content; chooses to "Like" the paired digital music content; communicates with the first user; or shares the paired digital content with other users.

7. The application of claim 1, wherein the live-streamed digital visual media content further comprises one or more of a digital photograph, a digital video clip, and a graphics interchange format (GIF) file included with the live-streamed digital visual media content.

8. A method for enabling the creation and sharing of a music-based social media post comprising digital visual media content paired with digital music content between at least two users each having a communications device capable of transmitting and receiving electronic data content, comprising the steps of:
   providing a music-based social media network, including a host server capable of sending and receiving data transmissions and a software application providing a graphic user interface for one or more users to interact with the music-based social media network;

receiving, in the host server, live-streamed digital visual media content selected by a first user through interaction with the graphic user interface and transmitted from the first user's communications device in digital communication with the host server, wherein the live-streamed digital visual media content selection is assigned a first uniform resource locator (URL) stored in the host server;

receiving, in the host server, at least one digital music content file selection selected by the first user through interaction with the graphic user interface to be streamed from an external audio content provider, and wherein the digital music content selection file is assigned a second uniform resource locator (URL) stored in the host server and wherein the second URL is separate from the first URL;

pairing, in the host server, the first URL of the live-streamed digital visual media content with the second URL of the digital music content file selection, whereby the live-streamed digital visual media content and digital music content are configured to be presented in parallel while remaining separate and without creation of a single combined file having both the selected live-streamed digital visual media content and the selected digital music content file;

sharing, upon a request by the first user received by the host server, the paired first URL of the live-streamed digital visual media content with the second URL of the digital music content file with at least one additional user, thereby creating a visual social media post with corresponding music soundtrack on a communications device of the at least one additional user; and playing, upon receiving a request at the host server, the paired first URL of the live-streamed digital visual media content with the second URL of the digital music content selection on the communications device of the at least one additional user by executing both the first URL and second URL simultaneously, wherein the digital music content selections or music-listening preferences of a particular user are compiled into a user music preference profile that is used to pair digital music content based on the compiled user music preference profile along with digital advertising presented to the user through a digital media source.

9. The method of claim 8, wherein the communications device of the first user and any other user comprises at least one of a smartphone, tablet computer, laptop computer, desktop computer, virtual reality (VR) device, augmented reality (AR) device, and personal data assistant.

10. The method of claim 8, wherein the first user and at least one additional user may at least one of: start the streaming of the digital music content selection, stop the streaming of digital music content selection, choose to "Like" the paired digital music content selection and live-streamed digital visual media content, communicate with other users, and share the paired digital music content selection and live-streamed digital visual media content with other users.

11. The method of claim 10, wherein sharing the paired digital music content selection and live-streamed digital visual media content comprises electronically sending to the communications device of at least one additional user a link to a location in the host server to which the communications device of the at least one additional user can access the shared content for interactive display on the communications device of the at least one additional user.

12. The method of claim 8, wherein the live-streamed digital visual media content comprises a live-streaming video feed played in real time or near real time with an actual performance of the visual media content.

13. The method of claim 8, wherein an additional media content selection is selected by the first user to be paired with the digital music content selection and live-streamed digital visual media content, wherein the additional media content selection includes an additional URL that enables the additional media content selection to be streamed simultaneously but separately with the digital music content selection and the live-streamed digital visual media content.

14. The method of claim 13, wherein the additional media content selection is at least one of additional digital audio content and additional digital visual media content.

15. The method of claim 8, wherein the digital media source is at least one of streaming television, streaming cable, the application, and a third-party application.

16. The method of claim 15, wherein the third-party application comprises at least one of Facebook, Instagram, Snapchat, Netflix, Hulu, and Amazon Prime.

17. A method for creating personalized digital music and digital visual media content to users of media devices, the method performed on a computer system running an application including computer executable instructions to perform steps, the method comprising the steps of:

uploading live-streamed digital visual media content to a host server in digital communication with a communications device of a user, wherein the live-streamed digital visual media content is assigned a first uniform resource locator (URL) stored in the host server;

selecting at least one digital music content file to be streamed from an external audio content provider in digital communication with the host server or uploaded to the host server, wherein the at least one digital music content file is personalized to the user, and wherein the selected digital music content file has a second URL stored in the host server, and wherein the second URL is separate from the first URL;

pairing at least a portion of the live-streamed digital visual media content with at least a portion of the digital music content file to create paired digital music and live-streamed digital visual media content, whereby the live-streamed digital visual media content and the digital music content are presented in parallel while remaining separate and without creation of a single combined file; and playing, on the communications device of the user, the paired digital music and live-streamed digital visual media content by executing the first URL and the second URL simultaneously, wherein the digital music content selections or music-listening preferences of a particular user are compiled into a user music preference profile that is used to pair digital music content based on the compiled user music preference profile along with digital advertising presented to the user through a digital media source.

18. The method of claim 17, wherein the live-streamed digital visual media content comprises a live-streaming video feed played in real time or near real time with an actual performance of the visual media content.

\* \* \* \* \*